US012260814B2

(12) United States Patent
Seo et al.

(10) Patent No.: US 12,260,814 B2

(45) Date of Patent: Mar. 25, 2025

(54) DISPLAY DEVICE

(71) Applicant: LG Display Co., Ltd., Seoul (KR)

(72) Inventors: Woongjin Seo, Paju-si (KR); SeonMee Lee, Paju-si (KR); SungJin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/530,676

(22) Filed: Dec. 6, 2023

(65) Prior Publication Data

US 2024/0221638 A1 Jul. 4, 2024

(30) Foreign Application Priority Data

Dec. 29, 2022 (KR) ........................ 10-2022-0188338

(51) Int. Cl.
*G09G 3/32* (2016.01)
*G09G 3/3225* (2016.01)

(52) U.S. Cl.
CPC ... *G09G 3/3225* (2013.01); *G09G 2300/0452* (2013.01); *G09G 2320/046* (2013.01); *G09G 2340/16* (2013.01)

(58) Field of Classification Search
None
See application file for complete search history.

(56) References Cited

U.S. PATENT DOCUMENTS

2008/0106649 A1* 5/2008 Prusia .................... G09G 5/003 348/607
2016/0189336 A1 6/2016 Lee et al.
2018/0114483 A1* 4/2018 Kim .................... H10K 59/353

FOREIGN PATENT DOCUMENTS

KR 10-2021-0098888 A 8/2021

* cited by examiner

*Primary Examiner* — Joseph R Haley
(74) *Attorney, Agent, or Firm* — Morgan, Lewis & Bockius LLP

(57) ABSTRACT

A display device may include a display panel having subpixels, a controller configured to generate an output image frame based on moving a received input image frame for the subpixels according to time and to output the generated output image frame, and a panel driver configured to display the generated output image frame on the display panel. A movement order for the subpixels may be determined based on a movement direction and an arrangement of the subpixels disposed on the display panel. The subpixels may be utilized in outputting the generated output image frame to the display panel.

10 Claims, 17 Drawing Sheets

DISPLAY DEVICE

CROSS-REFERENCE TO RELATED APPLICATION

This application claims the benefit of and priority to Korean Patent Application No. 10-2022-0188338 filed on Dec. 29, 2022, the entirety of which is incorporated herein by reference for all purposes.

BACKGROUND

1. Technical Field

The present disclosure relates to an apparatus and particularly to, for example, without limitation, a display device capable of improving an afterimage lifespan by moving an image according to time.

2. Discussion of the Related Art

A light emitting display device has a high luminance, a low driving voltage, and an ultra-thin film by using a self-luminous element. The light emitting display device has an advantage of being implemented in a free shape.

The light emitting display device displays an image by supplying a current corresponding to a data signal to a light emitting element of each of pixels to emit light from the light emitting element.

The light emitting display device may generate an afterimage phenomenon in which luminance is lowered due to deterioration of light emitting elements of pixels caused by prolonged driving, and may decrease an afterimage lifespan which may be a point in time when the afterimage phenomenon occurs due to the increase in displaying fixed images.

The light emitting display device may move an image according to time in order to improve the afterimage lifetime.

However, when the display device is a monitor close to a user, an image movement may be easily recognized.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors of the present disclosure have recognized the problems and disadvantages of the related art, have performed extensive research and experiments, and have developed a new invention. Accordingly, one or more aspects of the present disclosure are directed to a display device that substantially obviate one or more of the problems due to limitations and disadvantages of the related art.

An aspect of one or more embodiments of the present disclosure is to provide a display device capable of improving an afterimage lifespan by an image movement according to time and preventing the image movement from being recognized.

In accordance with one or more aspects of the present disclosure, a display device may include a display panel having subpixels, a controller configured to generate an output image frame based on moving a received input image frame for the subpixels according to time and to output the generated output image frame, and a panel driver configured to display the generated output image frame on the display panel. A movement order for the subpixels may be determined based on a movement direction and an arrangement of the subpixels disposed on the display panel. The subpixels may be utilized in outputting the generated output image frame to the display panel.

Other aspects, features and advantages of the present disclosure are set forth in the present disclosure and will also be apparent from the present disclosure or may be learned by practice of the inventive concepts provided herein. Other aspects, features and advantages of the present disclosure may be realized and attained by the descriptions provided in the present disclosure, including the claims and the drawings. Nothing in this section should be taken as a limitation on the claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure. In the drawings.

Figure 1:
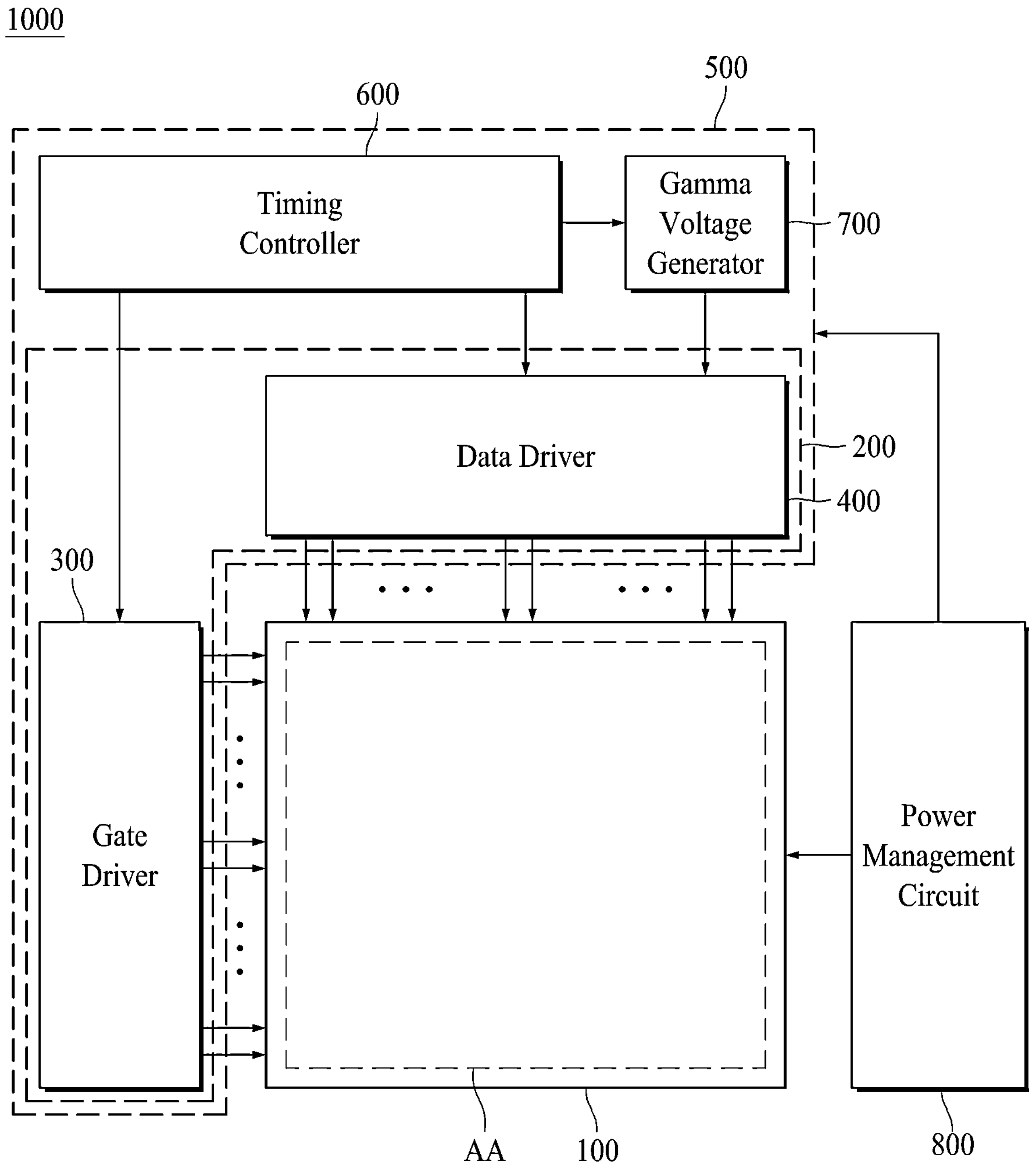
FIG. 1 is a block diagram illustrating a configuration of a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure. Further, the present disclosure is defined by the scope of claims and their equivalents.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "on a top of," "upon," "on top of," "over," "under," "above," "below," "beneath," "near," "close to," "adjacent to," "beside," or "next to" another structure, this description should be construed as including a case in which the structures contact each other directly as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus another event may occur therebetween, unless a more limiting term, such as "just," "immediate(ly)," or "direct (ly)," is used.

It is understood that, although the terms "first," "second," and the like may be used herein to describe various elements (e.g., layers, films, regions, components, sections, or the like), these elements should not be limited by these terms. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," or "adhered" to another element, the element can not only be directly connected, coupled, attached, or adhered to another element, but also be indirectly connected, coupled, attached, or adhered to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The terms "first direction," "second direction," and the like should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" or "$n^{th}$" may refer to "nnd" or "$n^{nd}$" (e.g., 2nd where n is 2), or "nrd" or "$n^{rd}$" (e.g., 3rd where n is 3), and n may be a natural number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

The phase that a first element is "provided in" a second element may be understood as that at least a portion of the first element is provided in the second element or that the entirety of the first element is provided in the second element. The phase that a first element "overlaps" a second element may be understood as that at least a portion of the first element overlaps a least a portion of the second element, that the entirety of the first element overlaps with a least a portion of the second element, or that at least a portion of the first element overlaps with the entirety of the second element.

Features of various embodiments of the present disclosure may be partially or entirely coupled to or combined with each other, may be technically associated with each other, and may be variously operated, linked or driven together. The embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

Figure 2A:
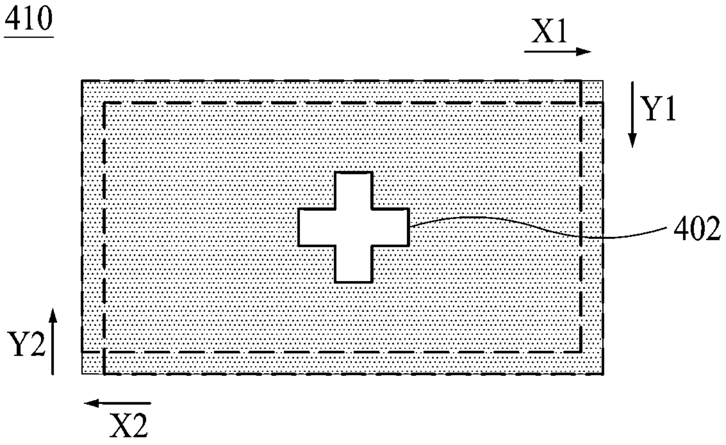
FIGS. 2A and 2B illustrate a method for moving an image of a display device according to an example embodiment of the present disclosure.
Figure 2B:
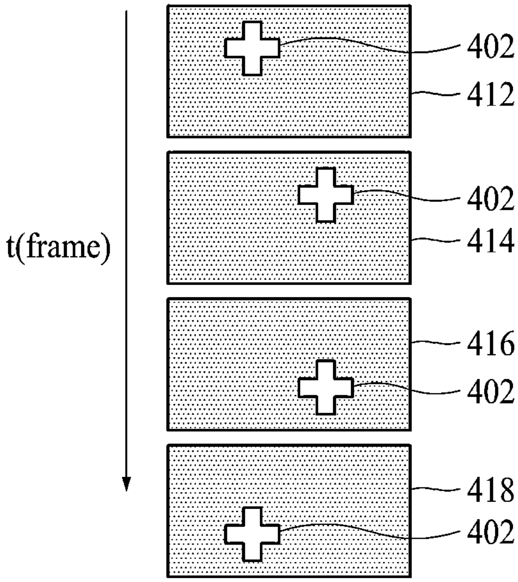

FIG. 1 is a block diagram illustrating a configuration of a display device according to an example embodiment of the present disclosure. FIGS. 2A to 2B illustrate a method for moving an image of a display device according to an example embodiment of the present disclosure.

A display device 1000 according to an example embodiment of the present disclosure may be, may include, or may use, a liquid crystal display device or an electroluminescent display device using a self-luminous element. An electroluminescent display device may be, may include, or may use, an organic light emitting diode OLED display device, a quantum dot light emitting diode display device, or an inorganic light emitting diode display device. The display device 1000 according to an example embodiment of the present disclosure may be, may include, or may use, a micro light emitting diode LED display device.

Referring to FIG. 1, the transparent display device 1000 according to an example embodiment of the present disclosure may include a display panel 100, a gate driver 300, a data driver 400, a timing controller 600, a gamma voltage generator 700, a power management circuit 800, and the like. The gate driver 300 and the data driver 400 may be collectively referred to as a panel driver 200 for driving the display panel 100. The gate driver 300, the data driver 400, the timing controller 600, and the gamma voltage generator 700 may be collectively referred to as a display driver 500.

The display panel 100 may display an image in or at a display area AA in which subpixels are arranged in a matrix form. The display panel 100 may be a panel in which a touch sensor screen overlapping the pixel matrix of the display area AA is embedded or attached. The subpixels may include a red (R) subpixel for emitting red light, a green (G) subpixel for emitting green light, and a blue (B) subpixel for emitting blue light. The subpixels may further include a white (W) subpixel for emitting white light to increase luminance. A unit pixel may include two, three, or four subpixels among R, G, B, and W subpixels.

Each subpixel may include a light emitting element and a pixel circuit independently driving the light emitting element. The light emitting element may include an organic light emitting diode, a quantum dot light emitting diode, and an inorganic light emitting diode. The pixel circuit may include thin film transistors (TFTs) of various configurations including a driving TFT for driving the light emitting element and a switching TFT for transmitting a data signal to the driving TFT, and a storage capacitor for storing a driving voltage of the driving TFT. The pixel circuit is electrically connected to signal lines including a gate line, a data line, a power line, and the like disposed on the display panel 100.

The power management circuit 800 may generate and output various driving voltages required for operating all components of the transparent display device, that is, the display panel 100 and the display driver 500, by using an input voltage supplied from the outside.

The gate driver 300 may be controlled according to a plurality of gate control signals supplied from the timing controller 600 and may individually drive gate lines of the display panel 100. The gate driver 300 may supply a scan signal of a gate-on voltage to the corresponding gate line during a driving period of each gate line and may supply a gate-off voltage to the corresponding gate line during a non-driving period of each gate line. The gate driver 300 may be embedded in a bezel area of the display panel 100 in the form of gate-in-panel (GIP) type formed with TFTs of the display area AA.

Meanwhile, the gate driver 300 embedded in the display panel 100 may receive the plurality of gate control signals from the timing controller 600 via a level shifter. The level shifter may generate the plurality of gate control signals by level-shifting or logic-processing control signals supplied from the timing controller 600, and may supply the gate control signals to the gate driver 300.

The gamma voltage generator 700 may generate a plurality of reference gamma voltages having different gamma voltage levels and may supply the reference gamma voltages to the data driver 400. The gamma voltage generator 700 may generate the plurality of reference gamma voltages corresponding to gamma characteristics of the display device under the control of the timing controller 600 and may supply the reference gamma voltages to the data driver 400. The gamma voltage generator 700 may adjust a reference gamma voltage level according to gamma data supplied from the timing controller 600 and may output the reference gamma voltage level to the data driver 400. The gamma voltage generator 700 may adjust a high potential power voltage, which is a maximum gamma voltage, according to a peak luminance control from the timing controller 600, may adjust the plurality of reference gamma voltages according to the adjusted high potential power voltage, and may output the adjusted reference gamma voltages to the data driver 400.

The data driver 400 may be controlled according to a data control signal supplied from the timing controller 600 and may convert digital data supplied from the timing controller 600 to an analog data signal by using a digital-to-analog conversion circuit. The data driver 400 may subdivide the plurality of reference gamma voltages supplied from the gamma voltage generator 700 into grayscale voltages and may convert the digital data to the analog data signal by using the subdivided grayscale voltages. The data driver 400 may supply the converted data signal to the data line of the display panel 100.

In addition, the data driver 400 may supply a reference voltage to a reference line of the display panel 100 under the control of the timing controller 600. The data driver 400 may divide the reference voltage into the reference voltage for display and the reference voltage for sensing and may supply the divided reference voltage under the control of the timing controller 600.

The data driver 400 may sense a signal in which the driving characteristics of each subpixel are reflected through the reference line by the use of sensing portion under the control of the timing controller 600 using a voltage sensing method or a current sensing method.

The timing controller 600 may receive data of source image and timing control signals from a host system. The host system may be any one of a system of a portable terminal such as a computer, a television system, a set-top box, a tablet or a mobile phone, or a system in a vehicle. The timing control signals may include a dot clock, a data enable signal, a vertical synchronization signal, a horizontal synchronization signal, and the like.

The timing controller 600 may control the gate driver 300 and the data driver 400 using the timing control signals supplied from the host system and timing setting information stored therein. The timing controller 600 may generate the plurality of gate control signals for controlling the driving timing of the gate driver 300 and may supply the gate control signals to the gate driver 300. The timing controller 600 may generate the plurality of data control signals for controlling the driving timing of the data driver 400 and may supply the data control signals to the data driver 400.

The timing controller 600 may be sometimes referred to as a controller. The timing controller 600 according to an example embodiment of the present disclosure may be implemented using a controller or an image processor for performing the image processing described herein.

According to one or more example embodiments of the present disclosure, the timing controller 600 may be a timing controller typically used in the display field, may be a control device including a timing controller and able to perform other control functions, or may be a circuit in a control device. The timing controller 600 may be implemented using one or more of a variety of circuits or electronic components, such as an integrated circuit (IC), a field programmable gate array (FPGA), an application specific integrated circuit (ASIC), a processor, or the like. In some examples, the timing controller 600 may be mounted on a printed circuit board (PCB), a flexible printed circuit (FPC), or the like.

The timing controller 600 according to an example embodiment of the present disclosure may generate a second image frame in which image data of a first image frame supplied according to the elapse of a driving time is moved, and may output the second image frame. The timing controller 600 according to an example embodiment of the present disclosure may change a movement amount of the image data as the driving time "t" passes.

Referring to FIG. 2A, the timing controller 600 may generate and output the second image frame 410 in which image data of the received first image frame is moved in at least one of a first direction X1, a second direction Y1, a third direction X2, and a fourth direction Y2 as the driving time "t" passes. The timing controller 600 may determine the driving time "t" by using a count value obtained by counting the vertical synchronization signal, and may determine the movement amount of the image data according to the driving time "t".

Referring to FIG. 2B, it may be seen that a position of a specific pattern 402 having high luminance is changed in output image frames 412, 414, 416, and 418 displayed on the display panel 100 as the driving time "t" passes. Accordingly, an area for displaying the specific pattern 402 of high luminance is distributed in the display panel 100, thereby improving an afterimage lifetime of the light emitting display device.

Each of the output image frames 412, 414, 416, and 418 may include image data corresponding to subpixels arranged in the display area AA of the display panel 100, respectively. The position of the image data in each image frame may be or may represent the position of each subpixel.

The timing controller 600 according to an example embodiment of the present disclosure may generate and output the second image frame in which image data of the first image frame supplied according to the elapse of the driving time is moved for each subpixel. The timing controller 600 according to an example embodiment of the present disclosure may determine a movement order for each subpixel according to (or based on) a subpixel arrangement structure arranged in the display panel 100 and an image movement direction. A detailed description thereof is provided below.

The timing controller 600 according to an example embodiment of the present disclosure may divide the image data of the first image frame into several frames (e.g., 412, 414, 416, and 418), to thereby generate and output the second image frame in which image data is moved for each subpixel according to the elapse of the driving time.

The timing controller 600 according to an example embodiment of the present disclosure may generate the second image frame whose sharpening level of image is changed according to (or based on) the image movement direction in association with the smooth image movement described above.

The second image frame may include at least one of a non-scaling area moved while maintaining a size (e.g., width, length) of a partial area from the first image frame in a timing controller 600, a down-scaling area (or reduced area) moved by reducing a size of a partial area, and an up-scaling area (or enlarged area) moved by enlarging a size of a partial area.

The timing controller 600 may further perform various image processing operations including image quality correction, deterioration correction, and luminance correction for power consumption reduction with respect to the second image frame, and may supply the image-processed data to the data driver 400.

The timing controller 600 may additionally correct the image-processed data by applying a compensation value for a characteristic deviation of each subpixel stored in a memory before supplying the image-processed data to the data driver 400. In a sensing mode, the timing controller 600 may sense the characteristics of each subpixel P of the display panel 100 through the data driver 400 and may update the compensation value of each subpixel stored in the memory using the sensing result. The sensing mode of the display device may be performed according to an instruction of the host system, may be performed by a user request through the host system, or may be performed according to a driving sequence of the timing controller 600.

As described above, the display device 1000 according to an example embodiment of the present disclosure may overcome the afterimage lifespan by dispersing the stress on each subpixel by the image movement according to the driving time.

The display device 1000 according to an example embodiment of the present disclosure may move the image data for each subpixel, may divide the image data according to the plurality of frames (e.g., 412, 414, 416, and 418), or may change the sharpness level in association with the image movement, thereby enabling the smooth image movement to minimize or prevent the image movement from being recognized.

Accordingly, the display device 1000 according to an example embodiment of the present disclosure may enable the smooth image movement when displaying TV content such as broadcast image or movie having low complexity and video, or even when displaying information technology (IT) contents such as a document, a website, a game image, and the like with high complexity and a large number of still images on a monitor close to a user, so that it is possible to minimize or prevent the image movement from being recognized.

Figure 3:
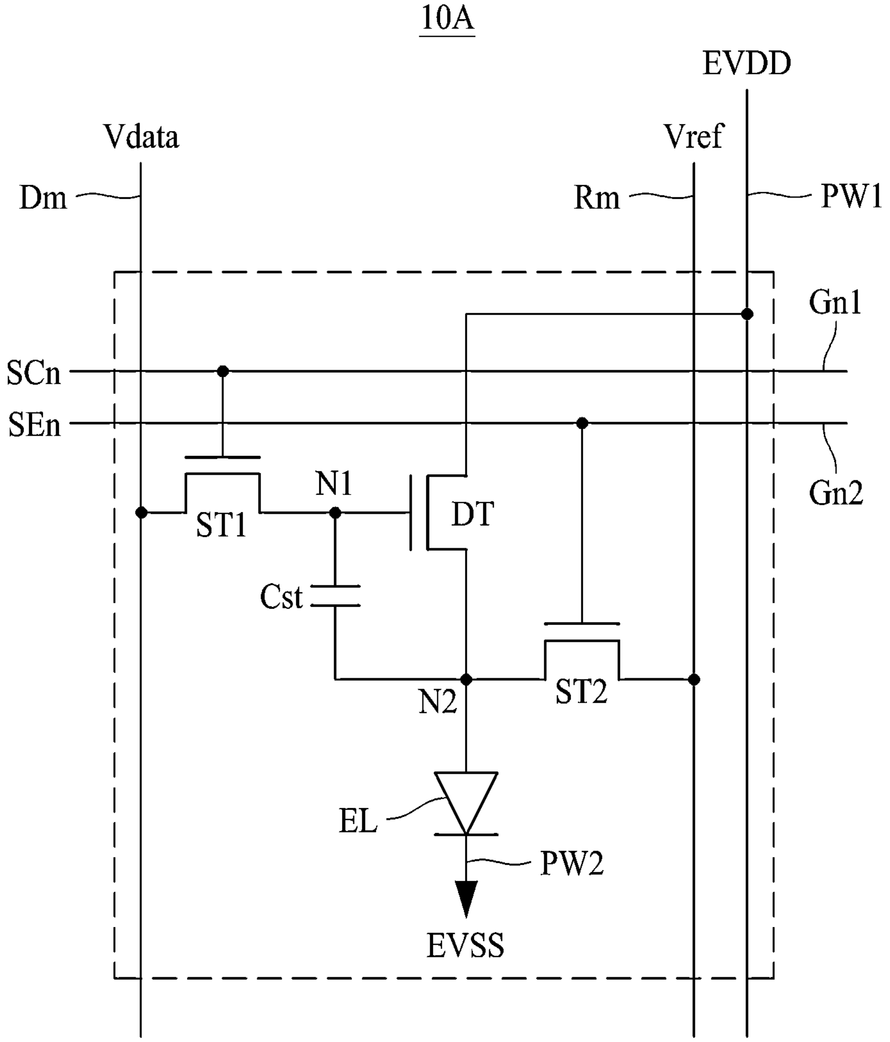
FIG. 3 is a circuit diagram illustrating a configuration of a pixel circuit according to an example embodiment of the present disclosure.

FIG. 3 is a circuit diagram illustrating a configuration of each subpixel according to an example embodiment of the present disclosure.

Referring to FIG. 3, each subpixel 10A may include a pixel circuit provided with a light emitting element EL connected between a first power line PW1 for supplying a high potential driving voltage EVDD (first power voltage) and a second power line PW2 for supplying a low potential driving voltage EVSS (second power voltage), first and second switching TFTs ST1 and ST2 and a driving TFT DT for independently driving the light emitting element EL, and a storage capacitor Cst.

The light emitting element EL may include an anode connected to a source node N2 of the driving TFT DT, a cathode connected to the second power line PW2, and an organic light emitting layer between the anode and the cathode. The anode may be independently provided for each subpixel. However, the cathode may be a common electrode which is shared by all of the subpixels. When a driving current is supplied from the driving TFT DT, electrons are injected into the organic light emitting layer from the cathode, and holes are injected into the organic light emitting layer from the anode, whereby fluorescent or phosphorescent materials emit light through the bond of electrons and holes in the organic light emitting layer, thereby generating light of a luminance proportional to a current value of the driving current.

The first switching TFT ST1 may be driven by a scan gate signal SCn supplied to the first gate line Gn1 from the gate driver 300, and the first switching TFT ST1 may supply a data voltage Vdata supplied from the data driver 400 to the data line Dm to the gate node N1 of the driving TFT DT.

The second switching TFT ST2 may be driven by a sense gate signal SEn supplied from the gate driver 300 to the second gate line Gn2, and the second switching TFT ST2 may supply the reference voltage Vref supplied from the data driver 400 to the reference line Rm to the source node N2 of the driving TFT DT. Meanwhile, in the sensing mode, the second switching TFT transistor ST2 may provide a current in which the characteristics of the driving TFT DT or the light emitting element EL is reflected to the reference line Rm.

The first and second switching TFTs ST1 and ST2 may be controlled by the different gate lines Gn1 and Gn2 as shown in FIG. 3 or may be controlled by the same gate line.

The storage capacitor Cst connected between the gate node N1 and the source node N2 of the driving TFT DT may charge the driving voltage Vgs of the driving TFT DT with a difference voltage between the data voltage Vdata and the reference voltage Vref supplied to the gate node N1 and the source node N2 through the first and second switching TFTs ST1 and ST2, and may hold the driving voltage Vgs charged for an emission period in which the first and second switching TFTs ST1 and ST2 are turned off.

The driving TFT DT may control an emission intensity of the light emitting element EL by controlling the current Ids flowing to the light emitting element EL according to the driving voltage Vgs charged in the storage capacitor Cst.

In FIG. 3, the gate lines Gn1 and Gn2 may be driven by the gate driver 300, and the data and reference lines Dm and Rm may receive the data voltage Vdata and the reference voltage Vref, respectively, from the data driver 400, and the power lines PW1 and PW2 may receive the high potential driving voltage EVDD and the low potential driving voltage EVSS, respectively, from the power management circuit 800.

Figure 4:
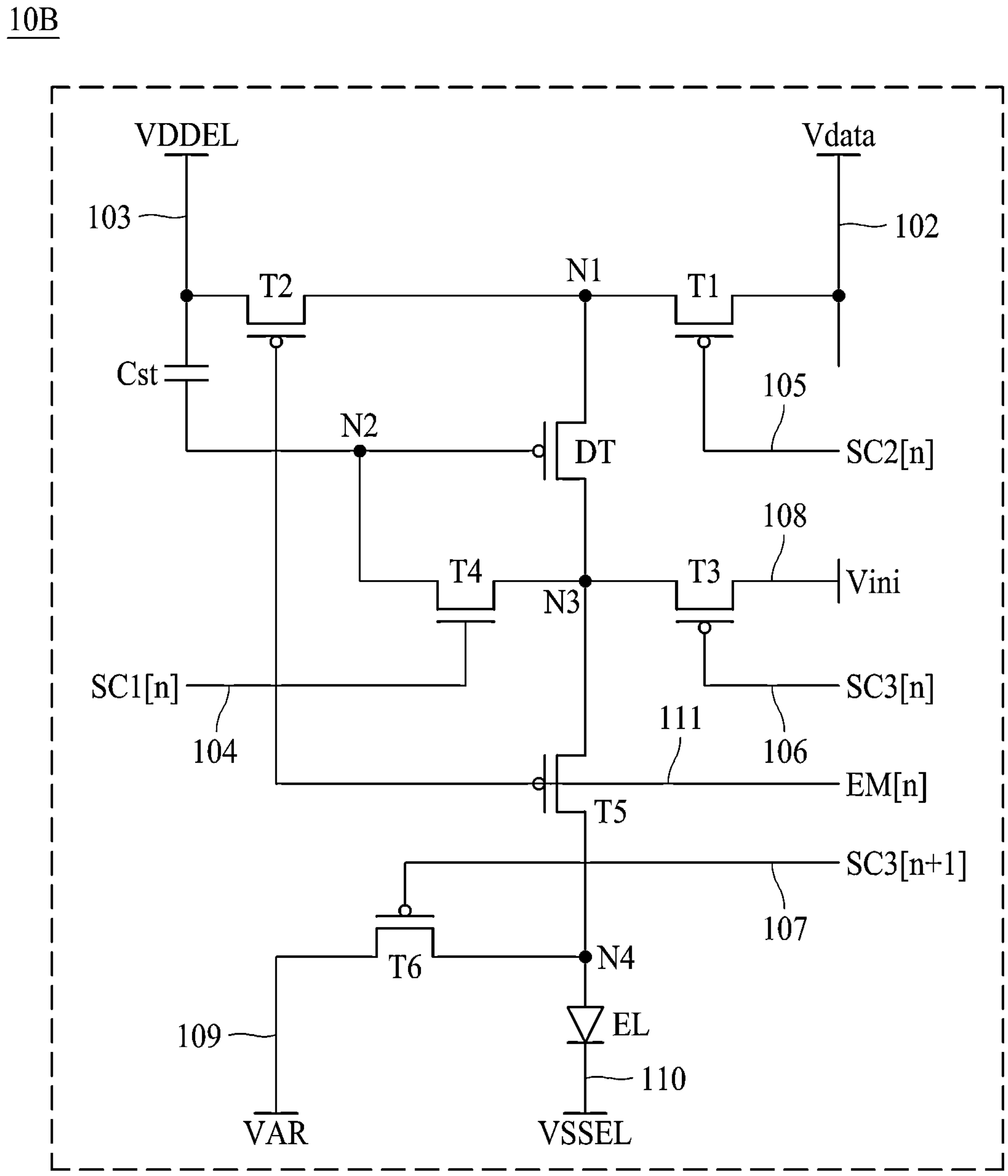
FIG. 4 is a circuit diagram illustrating a configuration of a pixel circuit according to an example embodiment of the present disclosure.

FIG. 4 is a circuit diagram illustrating a configuration of each subpixel according to an example embodiment of the present disclosure.

Referring to FIG. 4, a pixel circuit of each subpixel 10B may include a light emitting element EL, a driving TFT DT for supplying a current to the light emitting element EL, a plurality of TFTs T1 to T6, and a storage capacitor Cst. The TFTs of each pixel circuit may be TFTs using any one of polysilicon semiconductor, amorphous silicon semiconductor, and oxide semiconductor.

For example, the driving TFT DT and the TFTs T1 to T6 may be formed of polysilicon TFTs of P-type channel using polysilicon with high mobility.

In an example illustrated in FIG. 4, the driving TFT DT and the TFTs T1 to T3, T5, and T6 may be formed of polysilicon TFTs of P-type channel, and the compensation TFT T4 connected to the driving TFT DT in a diode structure may be configured as an oxide TFT of N-type channel using oxide semiconductor whose leakage current is smaller than that of polysilicon. When a screen update speed is relatively slow, the fourth switching TFT T4 may prevent a flicker by blocking the leakage current.

The light emitting element EL may include an anode connected to a drain electrode of the driving TFT DT via the emission control TFT T5, a cathode connected to a second power electrode 110 for supplying a second power voltage VSSEL, and an organic light emitting layer between the anode and the cathode. The light emitting element EL may generate light with luminance proportional to a current value of a driving current supplied from the driving TFT DT.

The compensation TFT T4 may connect a second node N3 controlled by a first gate line 104 and connected to a gate electrode of the driving TFT DT with a third node N3 connected to a drain electrode of the driving TFT DT. The compensation TFT T4 may be turned on by a gate-on voltage of a first gate signal SC1[n] supplied through the first gate line 104, and may be configured to connect the gate electrode and drain electrode of the driving TFT DT to each other, whereby the driving TFT DT may be connected in a diode structure. The first gate line 104 may be shared by two pixel row lines, that is, the (n−1)th and (n)th pixel row lines (where "n" is an integer equal to or more than 2). As a result, it is possible to reduce the bezel size and the size of the gate driver 300 embedded in the bezel area of the display panel 100.

The switching TFT T1 may be controlled by a second gate line 105 and is configured to connect a data line 102 to a first node N1 connected to a source electrode of the driving TFT DT. The switching TFT T1 may be turned on by a gate-on voltage of a second gate signal SC2[n] supplied through the second gate line 105, and may be configured to supply the data voltage Vdata supplied through the data line 102 to the source electrode of the driving TFT DT.

The operation control TFT T2 may be controlled by an emission control line 111 and is configured to connect a first power line VDDEL to the first node N1 connected to the source electrode of the driving TFT DT. The operation control TFT T2 may be turned on by a gate-on voltage of an emission control signal EM[n] supplied through the emission control line 111 and may be configured to supply a first power voltage VDDEL supplied through a first power line 103 to the source electrode of the driving TFT DT.

The light emission control TFT T5 may connect the third node N3 controlled by the emission control line 111 and connected to the drain electrode of the driving TFT DT to a fourth node N4 connected to the anode electrode of the light emitting element EL. The light emission control TFT T5 may be turned on by the gate-on voltage of the emission control signal EM[n] supplied through the emission control line 111 and may be configured to connect the drain electrode of the driving TFT DT to the anode electrode of the light emitting element EL.

The first initialization TFT T3 may be controlled by a third gate line 106 and is configured to connect the third node N3 connected to the drain electrode of a driving TFT DT to a first initialization line 108. The first initialization TFT T3 may be turned on by a gate-on voltage of a second gate signal SC3[n] supplied through the third gate line 106 and may be configured to supply a first initialization voltage Vini supplied through the first initialization line 108 to the third node N3 connected to the drain electrode of the driving TFT DT.

The second initialization TFT T6 may be controlled by a fourth gate line 107 and may be configured to connect a second initialization line 109 to the fourth node N4 connected to the anode of the light emitting element EL. The second initialization TFT T6 may be turned on by a gate-on voltage of a fourth gate signal supplied through the fourth gate line 107 and may be configured to supply a second initialization voltage VAR (anode reset voltage) supplied through the second initialization line 109 to the fourth node N4 connected to the anode electrode of the light emitting element LED. The fourth gate line 107 may share the third gate line for supplying a third gate signal SC3[n+1] in the (n+1)th row line (where "n" is a positive integer).

The storage capacitor Cst may be connected between the first power line 103 and the second node N2 connected to the gate electrode of the driving TFT DT. The storage capacitor Cst may store or charge a difference voltage between the first power supply voltage VDDEL supplied through the first power line 103 and the data voltage Vdata supplied to the second node N2 via the switching TFT T2 and the driving TFT DT and the compensation TFT T1 from the data line 102. While the driving TFT DT is connected in the diode structure via the compensation TFT T4, the storage capacitor Cst may sample and store a threshold voltage Vth of the driving TFT DT, and may provide the data voltage Vdata+Vth compensated with the threshold voltage Vth to the gate electrode of the driving TFT DT. Accordingly, the storage capacitor Cst may store or charge the difference voltage between the first power voltage VDDEL and the data voltage Vdata in which threshold voltage Vth of the driving TFT DT is compensated with a target voltage, and may provide the charged target voltage to the driving voltage Vgs between the gate and source electrodes of the driving TFT DT. Therefore, the characteristic deviation of the driving TFT DT between the subpixels may be compensated.

The driving TFT DT may control the current Ids to flow to the light emitting element EL according to the driving voltage charged in the storage capacitor Cst, thereby controlling the emission intensity of the light emitting element EL.

In FIG. 4, the gate lines 104, 105, 106, and 107 may be driven by the gate driver 300, and the emission control line 111 may be driven by the emission control driver (not shown) disposed in a bezel area of the display panel 100 together with the gate driver 300. The data voltage Vdata may be supplied from the data driver 400. The first power voltage VDDEL, the second power voltage VSSEL, the first initialization voltage Vini, and the second initialization voltage VAR may be supplied from the power management circuit 800.

Figure 5:
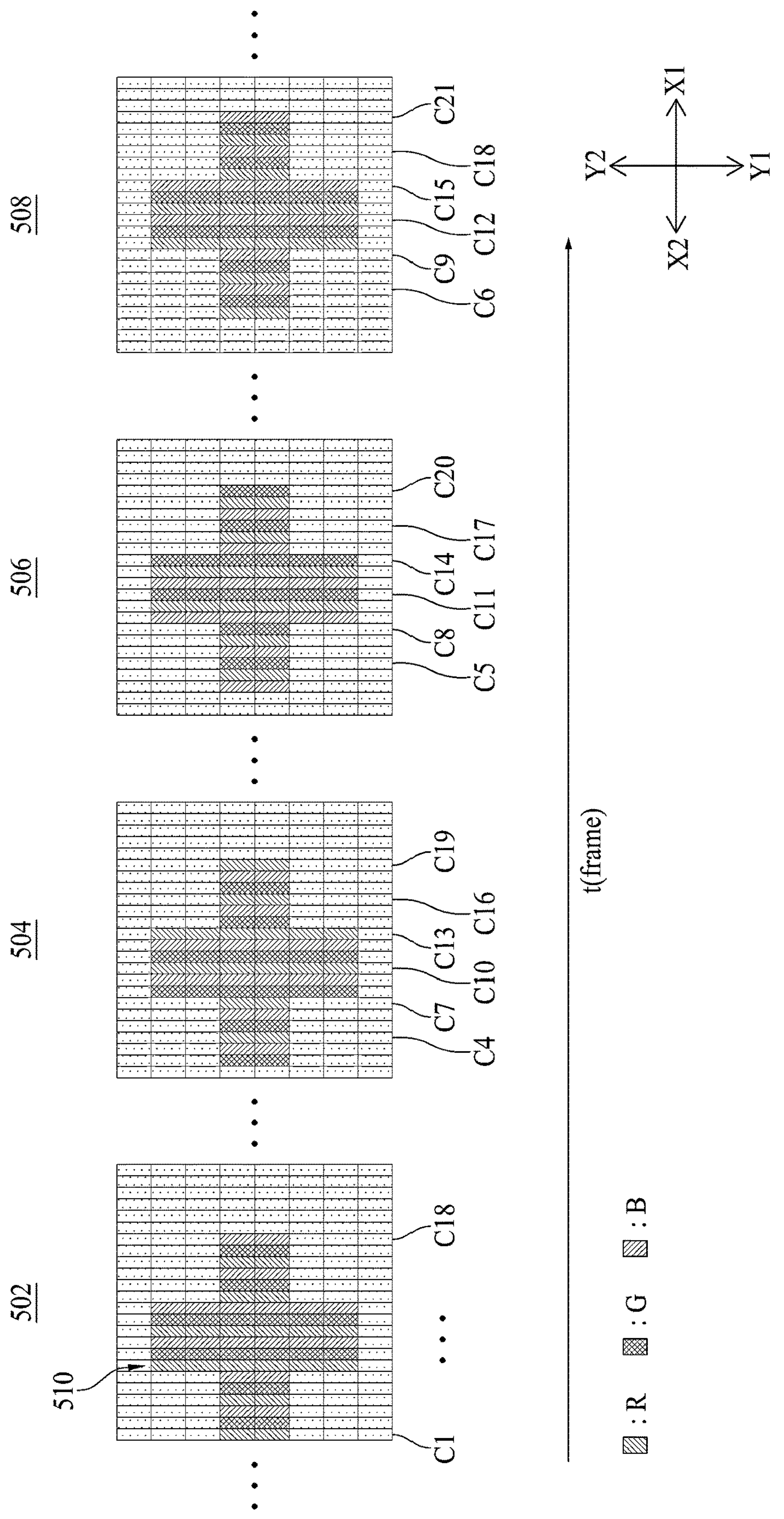
FIG. 5 illustrates an image movement method of the display device according to an example embodiment of the present disclosure.

FIG. 5 illustrates an image movement method of the display device according to an example embodiment of the present disclosure.

Referring to FIG. 5, second to fifth image frames 502, 504, 506, and 508 are displayed on the display panel (100, FIG. 1) by sequentially moving image data R, G, and B of the first image frame supplied according to the driving time "t" in the timing controller 600 for each subpixel.

Each of the second to fifth image frames 502, 504, 506, and 508 may include image data corresponding to the subpixels arranged in the display area AA of the display panel 100, respectively. The position of the image data in each image frame 502, 504, 506, and 508 may be or may represent the position of each subpixel.

Referring to FIGS. 1 and 5, the display panel 100 may have a subpixel arrangement structure in which R, G, and B subpixels are arranged in parallel in a first direction X1.

The timing controller 600 may be supplied with the same first image frame at a certain driving time "t". The timing controller 600 may then generate and output the second to fifth image frames 502, 504, 506, and 508 by sequentially moving the image data R, G, and B of the first image frame supplied according to the driving time "t" in the first direction X1 for each subpixel.

For example, the timing controller 600 may output the same second image frame 502 as the received first image frame, so that the display panel (100, FIG. 1) may display the second image frame 502 at a first time. The second image frame 502, which is the same as the first image frame, may include a cross-shaped test pattern 510 that can be used to check the image movement. In the second image frame 502 which is the same as the first image frame, R, G, and B data of the test pattern 510 may be displayed with high luminance from the first column C1 to the eighteenth column C18 in the first direction X.

Then, the timing controller 600 may generate and output the third image frame 504 in which R data among R, G, and B data of the received first image frame is moved in the first direction X1 by one pixel, so that the display panel (100, FIG. 1) may display the third image frame 504 at a second time. When the third image frame 504 displayed at the second time is compared with the second image frame 502 displayed at the first time, the R data among the R, G, and B data of the second image frame 502 may be moved in the first direction X1 by one pixel (C1→C4, C4→C7, C7→C10, C10→C13, C13→C16, C16→C19), and the positions of the remaining G and B data may be the same.

Then, the timing controller 600 may generate and output the fourth image frame 506 in which R and G data among the R, G, and B data of the supplied first image frame are moved in the first direction X1 by one pixel, so that the display panel (100, FIG. 1) may display the fourth image frame 506 at a third time. When the fourth image frame 506 displayed at the third time is compared with the third image frame 504 displayed at the second time, the G data among the R, G, and B data of the third image frame 504 may be moved in the first direction X1 by one pixel (C2→C5, C5→C8, C8→C11, C11→C14, C14→C17, C17→C20), and the positions of the remaining R and B data are the same. In this example, the G data of the third image frame 504 (which is the same as the G data of the second image frame 502) is moved along the first direction X1 by one pixel to produce the G data of the fourth image frame 506. However, in this example, the R data of the third image frame 504 is not moved; hence, the R data of the fourth image frame 506 is the same as the R data of the third image frame 504. Further, in this example, the B data of the third image frame 504 is not moved; hence, the B data of the fourth image frame 506 is the same as the B data of the third image frame 504, which is the same as the B data of the second image frame 502.

Then, the timing controller 600 may generate and output the fifth image frame 508 in which all the R, G, and B data of the supplied first image frame are moved in the first direction X1 by one pixel, so that the display panel (100, FIG. 1) may display the fifth image frame 508 at a fourth time. When the fifth image frame 508 displayed at the fourth time is compared with the fourth image frame 506 displayed at the third time, the B data among the R, G, and B data of the fourth image frame 506 may be moved by one pixel in the first direction X1 (C3→C6, C6→C9, C9→C12, C12→C15, C15→C18, C18→C21), and the positions of the remaining R and G data may be the same. In this example, the B data of the fourth image frame 506 (which is the same as the B data of the second and third image frames 502 and 504) is moved along the first direction X1 by one pixel to produce the B data of the fifth image frame 508. However, in this example, the R data of the fourth image frame 506 is not moved; hence, the R data of the fifth image frame 508 is the same as the R data of the fourth image frame 506, which is the same as the R data of the third image frame 504. Further, in this example, the G data of the fourth image frame 506 is not moved; hence, the G data of the fifth image frame 508 is the same as the G data of the fourth image frame 506.

In an inspection device, the first image frame including the test pattern 510 together with the second image frame 502 may be provided to the display device according to an example embodiment of the present disclosure during a test operation. Then, outputs of the second to fifth image frames 502, 504, 506, and 508 displayed on the display device are confirmed through measurement by the inspection device, thereby determining (e.g., by the timing controller 600) whether to apply the smooth image movement of the display device according to an example embodiment of the present disclosure.

The timing controller 600 may sequentially move the R, G, and B data of the received first image frame for each subpixel as much as the pixel movement amount determined at every set time (or every predetermined time), that is, by each color. The timing controller 600 may determine a movement order for each subpixel (or for each color) according to the subpixel arrangement structure and a movement direction arranged on the display panel 100.

Accordingly, the image frames 502, 504, 506, and 508 displayed on the display panel 100 may move smoothly with the elapse of the driving time "t", thereby minimizing or preventing the movement of the image from being recognized.

The movement direction may be sequentially applied and circulated in the first to fourth directions X1, Y1, X2, and Y2. The amount of pixel movement determined for each set period in each of the first to fourth directions X1, Y1, X2, and Y2 may be gradually increased and reset as the driving time "t" passes from a predetermined minimum pixel movement amount to a maximum pixel movement amount.

The first direction X1 and the second direction Y1 may be perpendicular to each other, and the third direction X2 and the fourth direction Y2 may be perpendicular to each other. The first direction X1 and the third direction X2 may be opposite to each other in the X axis. The second direction Y1 and the fourth direction Y2 may be opposite to each other in the Y axis. The first direction X1 may be a left direction and the third direction X2 may be a right direction. The second direction Y1 may be a lower direction, and the fourth direction Y2 may be an upper direction.

FIGS. 6 to 18 illustrate various pixel structures applied to or used in the display device according to an example embodiment of the present disclosure.

Referring to FIGS. 6 to 18, a movement order of each subpixel may be determined according to a movement direction in which an output image displayed on a display panel 100 (see FIG. 1) moves and relative positions of subpixels disposed in a unit pixel PX. The output image may be preferentially moved from the subpixel located in a direction opposite to the movement direction. The output image may move for each subpixel in the order of being arranged in the movement direction in the unit pixel. Herein, in one or more aspects, a subpixel movement means that data of the subpixel moves.

Figure 6:
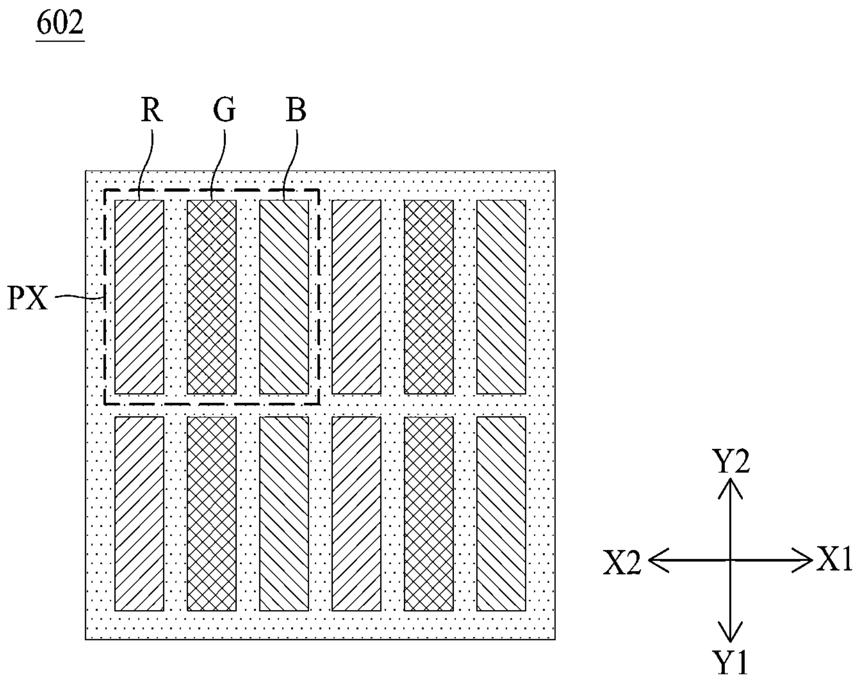
FIGS. 6 to 18 illustrate various subpixel arrangement structures applied to the display device according to an example embodiment of the present disclosure.

Referring to FIG. 6, the display panel according to an example embodiment of the present disclosure may have a first pixel arrangement structure 602 in which R, G, B subpixels are alternately (or sequentially) arranged in the first direction X1, and subpixels of the same color are arranged in the second direction Y1. The unit pixel PX may include red (R), green (G), and blue (B) subpixels.

When the output image displayed on the display panel having the first pixel arrangement structure 602 moves in the first direction X1, an image shift, in which data is moved by one pixel for each subpixel in the order of R, G, and B subpixels according to time (or over time), may be repeated up to a predetermined pixel movement amount. The movement of the order of R, G, and B subpixels may mean that the data of R subpixel is moved in the first output image, the data of G subpixel may be then moved relative to the first output image in the second output image, and the data of R subpixel may be then moved relative to the second output image in the third output image. Stated in another way, for example, the movement order of R, G, and B subpixels may represent that the data of R subpixels are moved to produce the first output image, the data of G subpixels are then moved relative to the first output image to produce the second output image, and the data of B subpixels are then moved relative to the second output image to produce the third output image.

When the output image displayed on the display panel having the first pixel arrangement structure 602 moves in the third direction X2, an image shift (in which data is moved by one pixel for each subpixel in the order of B, G, and R subpixels according to time) may be repeated up to a predetermined pixel movement amount.

When the output image displayed on the display panel having the first pixel arrangement structure 602 moves in each or one of the second direction Y1 and the fourth direction Y2, an image shift (in which data of R, G, and B subpixels simultaneously move by one pixel along a respective direction according to time) may be repeated up to a predetermined pixel movement amount.

Figure 7:
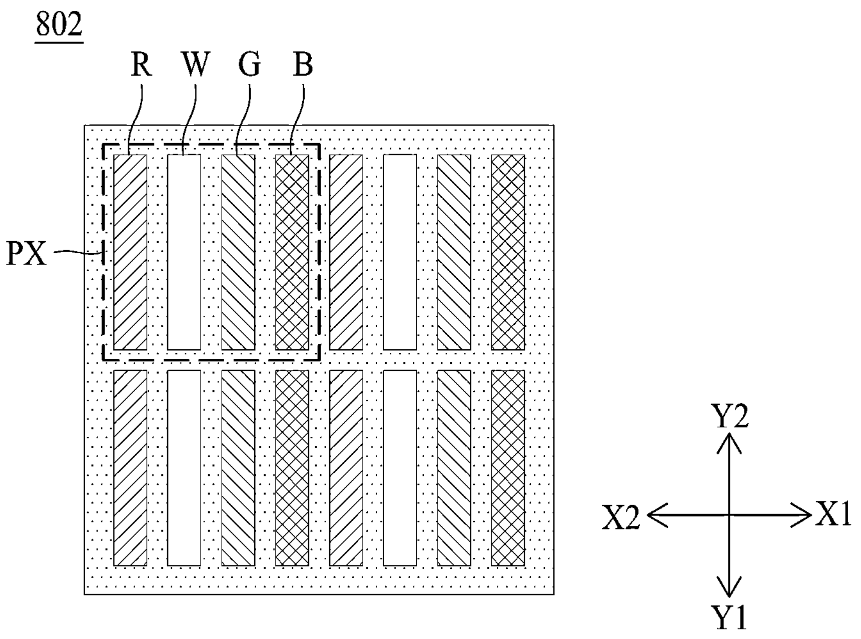

Referring to FIG. 7, the display panel according to an example embodiment of the present disclosure may have a second pixel arrangement structure 802 in which R, W, G, and B subpixels are alternately (or sequentially) arranged in the first direction X1, and subpixels of the same color are arranged in the second direction Y1. The unit pixel PX may include R, W, G, and B subpixels.

When the output image displayed on the display panel having the second pixel arrangement structure 802 moves in the first direction X1, an image shift (in which data is moved by one pixel for each subpixel in the order of R, W, G, and B subpixels according to time) may be repeated up to a predetermined pixel movement amount.

When the output image displayed on the display panel having the second pixel arrangement structure 802 moves in the third direction X2, an image shift (in which data is moved by one pixel for each subpixel in the order of B, G, W, and R subpixels according to time) may be repeated up to a predetermined pixel movement amount.

When the output image displayed on the display panel having the second pixel arrangement structure 802 moves in each or one of the second direction Y1 and the fourth direction Y2, an image shift (in which data of R, W, G, and B subpixels simultaneously move by one pixel along a respective direction according to time) may be repeated up to a predetermined pixel movement amount.

Figure 8:
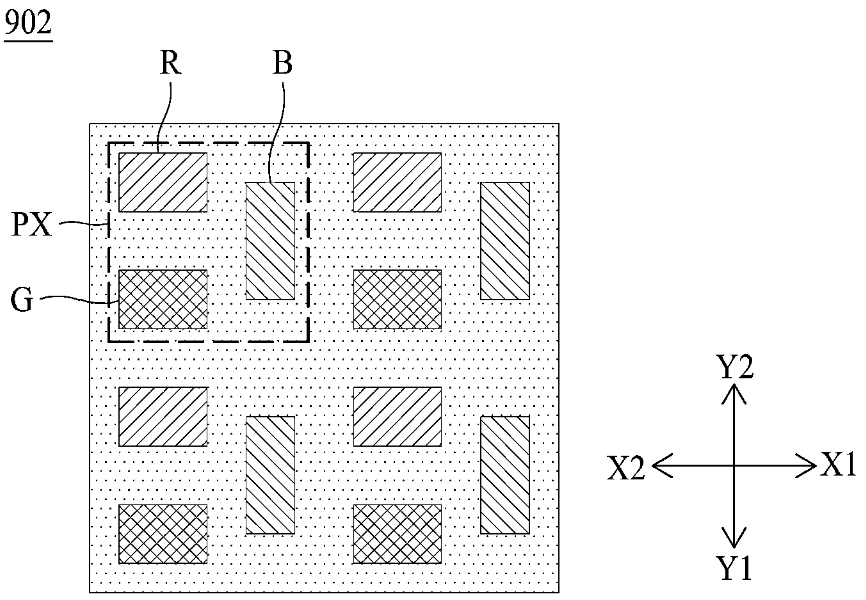

Referring to FIG. 8, the display panel according to an example embodiment of the present disclosure may have a third pixel arrangement structure 902 in which R/G and B subpixels are alternately arranged in the first direction X1. Further, R and G pixels are alternately arranged in a first column along the second direction Y1, and B subpixels are arranged in the second column. The unit pixel PX may include R, G, and B subpixels arranged in a "ㅕ" structure.

When the output image displayed on the display panel having the third pixel arrangement structure 902 moves in the first direction X1, an image shift (in which data of R/G subpixels move simultaneously by one pixel according to time, and then data of B subpixel(s) move by one pixel) may be repeated up to a predetermined pixel movement amount.

When the output image displayed on the display panel having the third pixel arrangement structure 902 moves in the third direction X2, an image shift (in which data of B subpixel(s) move by one pixel according to time, and then data of R/G subpixels move simultaneously by one pixel according to time) may be repeated up to a predetermined pixel movement amount.

When the output image displayed on the display panel having the third pixel arrangement structure 902 moves in the second direction Y1, an image shift (in which data for each subpixel moves in the order of R, B, and G subpixels according to time) may be repeated up to a predetermined pixel movement amount.

When the output image displayed on the display panel having the third pixel arrangement structure 902 moves in the fourth direction Y2, an image shift (in which the data for each subpixel moves in the order of G, B, and R subpixels according to time) may be repeated up to a predetermined pixel movement amount.

Figure 9:
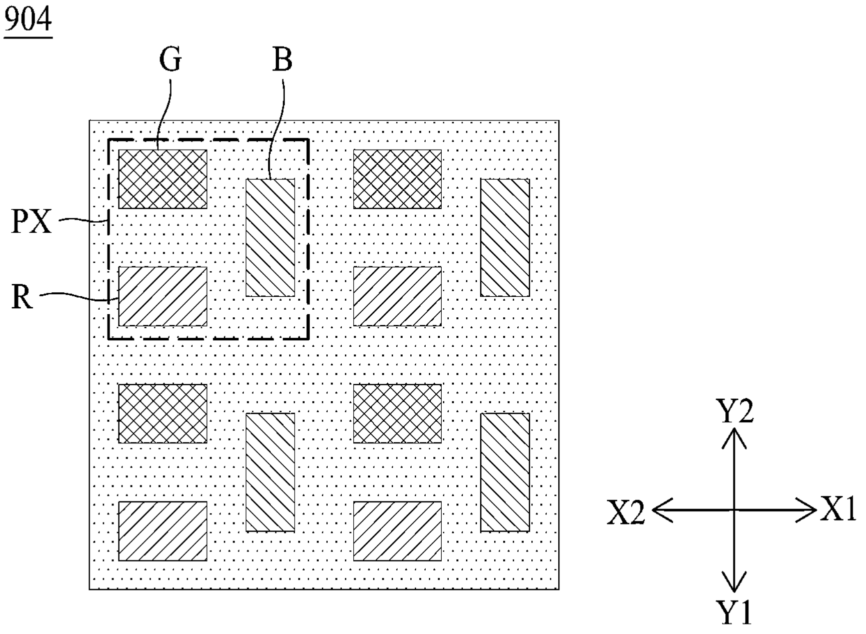

Referring to FIG. 9, the display panel according to an example embodiment of the present disclosure may have a fourth pixel arrangement structure 904 in which G/R and B subpixels are alternately arranged in the first direction X1. Further, G and R pixels are alternately arranged in a first column along the second direction Y1, and B subpixels are arranged in a second column. The unit pixel PX may include G, R, and B subpixels arranged "in a "ㅕ" structure.

When the output image displayed on the display panel having the fourth pixel arrangement structure 904 moves in the first direction X1, an image shift (in which the data of G/R subpixel move simultaneously by one pixel according to time, and then data of B subpixel(s) move by one pixel according to time) may be repeated up to a predetermined pixel movement amount.

When the output image displayed on the display panel having the fourth pixel arrangement structure 904 moves in the third direction X2, an image shift (in which the data of B subpixel(s) move by one pixel according to time, and then the data of G/R subpixels move simultaneously by one pixel) may be repeated up to a predetermined pixel movement amount.

When the output image displayed on the display panel having the fourth pixel arrangement structure 904 moves in the second direction Y1, an image shift (in which the data for each subpixel moves by one pixel in the order of G, B, and R subpixels according to time) may be repeated up to a predetermined pixel movement amount.

When the output image displayed on the display panel having the fourth pixel arrangement structure 904 moves in the fourth direction Y2, an image shift (in which the data for each subpixel moves by one pixel in the order of R, B, and G subpixels according to time) may be repeated up to a predetermined pixel movement amount.

Figure 10:
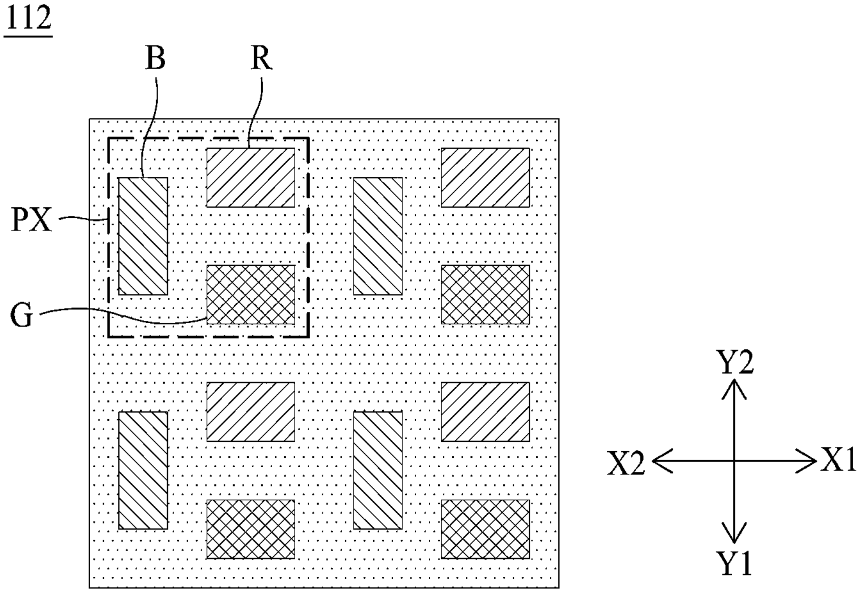

Referring to FIG. 10, the display panel according to an example embodiment of the present disclosure may have a fifth pixel arrangement structure 112 in which B and R/G subpixels are alternately arranged in the first direction X1. Further, B pixels are arranged in a first column, and R and G subpixels are alternately arranged in a second column along the second direction Y1. The unit pixel PX may include B, R, and G subpixels arranged in a "ㅑ" structure.

When the output image displayed on the display panel having the fifth pixel arrangement structure 112 moves in the first direction X1, an image shift (in which the data of B subpixel(s) move by one pixel according to time, and then the data of R/G subpixels move simultaneously by one pixel) may be repeated up to a predetermined pixel movement amount.

When the output image displayed on the display panel having the fifth pixel arrangement structure 112 moves in the third direction X2, an image shift (in which the data of R/G subpixels move simultaneously by one pixel according to time, and then the data of B subpixel(s) move by one pixel) may be repeated up to a predetermined pixel movement amount.

When the output image displayed on the display panel having the fifth pixel arrangement structure 112 moves in the second direction Y1, an image shift (in which the data for each subpixel moves by one pixel in the order of R, B, and G subpixels according to time) may be repeated up to a predetermined pixel movement amount.

When the output image displayed on the display panel having the fifth pixel arrangement structure 112 moves in the fourth direction Y2, an image shift (in which the data for each subpixel moves by one pixel in the order of G, B, and R pixels according to time) may be repeated up to a predetermined pixel movement amount.

Figure 11:
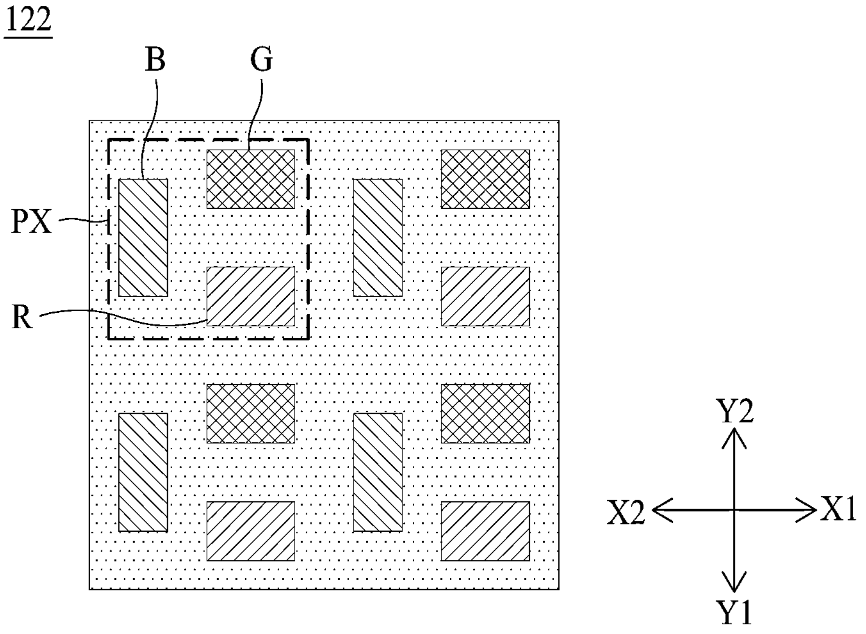

Referring to FIG. 11, the display panel according to an example embodiment of the present disclosure may have a sixth pixel arrangement structure 122 in which B and G/R subpixels are alternately arranged in the first direction X1. Further, B pixels are arranged in a first column, and G and R subpixels are alternately arranged in a second column along the second direction Y1. The unit pixel PX may include B, G, and R subpixels arranged in a "ㅑ" structure.

When the output image displayed on the display panel having the sixth pixel arrangement structure 122 moves in the first direction X1, an image shift (in which the data of B subpixel(s) move by one pixel according to time, and then the data of the G/R subpixels move simultaneously by one pixel) may be repeated up to a predetermined pixel movement amount.

When the output image displayed on the display panel having the sixth pixel arrangement structure 122 moves in the third direction X2, an image shift (in which the data of G/R subpixels move simultaneously by one pixel according to time, and then the data of B subpixel(s) move by one pixel) may be repeated up to a predetermined pixel movement amount.

When the output image displayed on the display panel having the sixth pixel arrangement structure 122 moves in the second direction Y1, an image shift (in which the data for each subpixel moves by one pixel in the order of G, B, and R pixels according to time) may be repeated up to a predetermined pixel movement amount.

When the output image displayed on the display panel having the sixth pixel arrangement structure 122 moves in the fourth direction Y2, an image shift (in which the data for each subpixel moves by one pixel in the order of R, B, and G subpixels according to time) may be repeated up to a predetermined pixel movement amount.

Figure 12:
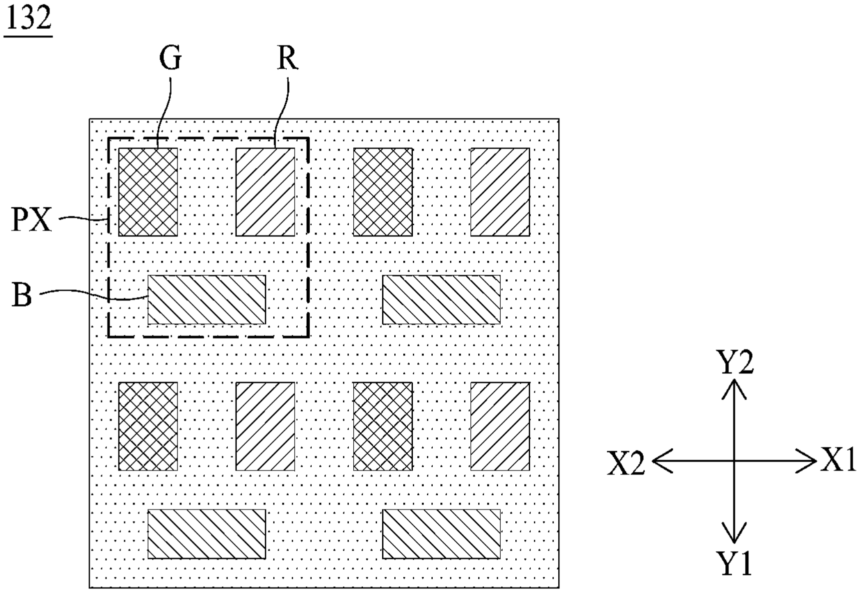

Referring to FIG. 12, the display panel according to an example embodiment of the present disclosure may have a seventh pixel arrangement structure 132 including a first row in which G/R subpixels are alternately arranged in the first direction X1, and a second row in which B pixels are arranged, wherein G/R and B subpixels are alternately arranged in the second direction Y1. The unit pixel PX may include G, R, and B subpixels arranged in a "ㅛ" structure.

When the output image displayed on the display panel having the seventh pixel arrangement structure 132 moves in the first direction X1, an image shift (in which the data for each subpixel moves by one pixel in the order of G, B, and R pixels according to time) may be repeated up to a predetermined pixel movement amount.

When the output image displayed on the display panel having the seventh pixel arrangement structure 132 moves in the third direction X2, an image shift (in which the data for each subpixel moves by one pixel in the order of R, B, and G subpixels according to time) may be repeated up to a predetermined pixel movement amount.

When the output image displayed on the display panel having the seventh pixel arrangement structure 132 moves in the second direction Y1, an image shift (in which the data of G/R subpixels move simultaneously by one pixel according to time, and then the data of B subpixel(s) move by one pixel) may be repeated up to a predetermined pixel movement amount.

When the output image displayed on the display panel having the seventh pixel arrangement structure 132 moves in the fourth direction Y2, an image shift (in which the data of B subpixel(s) move by one pixel according to time, and then the data of G/R subpixels move simultaneously by one pixel) may be repeated up to a predetermined pixel movement amount.

Figure 13:
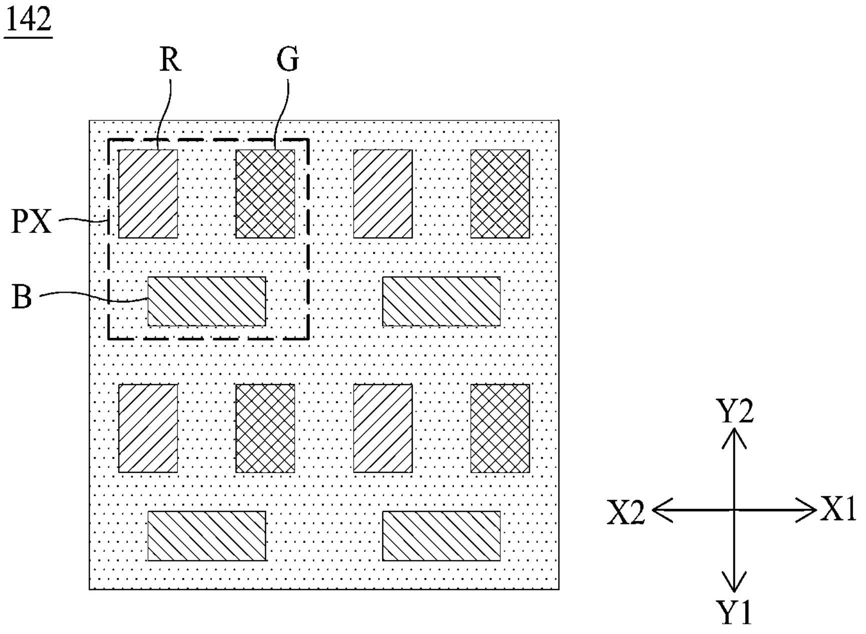

Referring to FIG. 13, the display panel according to an example embodiment of the present disclosure may have an eighth pixel arrangement structure 142 which includes a first row in which R/G subpixels are alternately arranged in the first direction X1, and a second row in which B subpixels are arranged, wherein the R/G subpixels and B subpixels are alternately arranged in the second direction Y1. The unit pixel PX may include R, G, and B subpixels arranged in a "ㅛ" structure.

When the output image displayed on the display panel having the eighth pixel arrangement structure 142 moves in the first direction X1, an image shift (in which the data for each subpixel moves by one pixel in the order of R, B, and G subpixels according to time) may be repeated up to a predetermined pixel movement amount.

When the output image displayed on the display panel having the eighth pixel arrangement structure 142 moves in the third direction X2, an image shift (in which the data for each subpixel moves by one pixel in the order of G, B, and R subpixels according to time) may be repeated up to a predetermined pixel movement amount.

When the output image displayed on the display panel having the eighth pixel arrangement structure 142 moves in the second direction Y1, an image shift (in which the data of R/G subpixels move simultaneously by one pixel according to time, and then the data of B subpixel(s) move by one pixel) may be repeated up to a predetermined pixel movement amount.

When the output image displayed on the display panel having the eighth pixel arrangement structure 142 moves in the fourth direction Y2, an image shift (in which the data of B subpixel(s) move by one pixel according to time, and then the data of R/G subpixels move simultaneously by one pixel) may be repeated up to a predetermined pixel movement amount.

Figure 14:
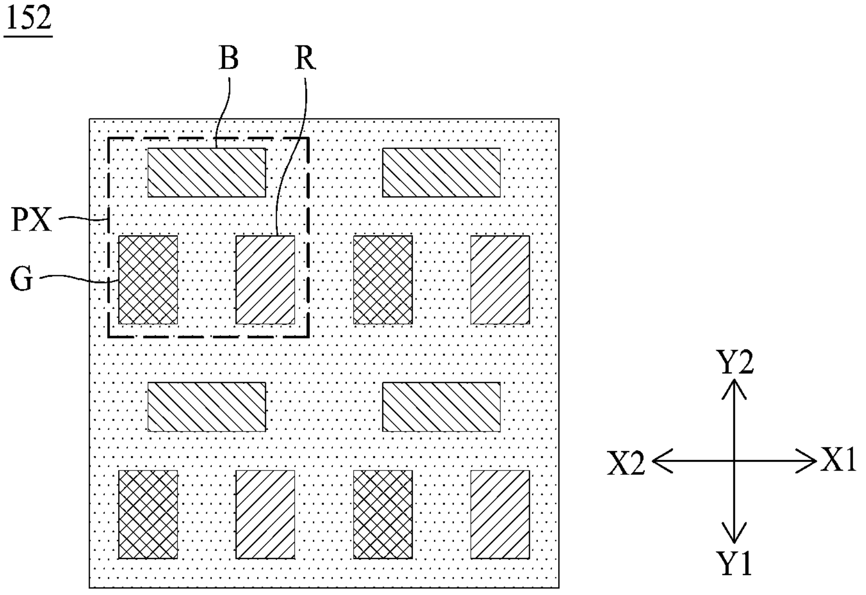

Referring to FIG. 14, the display panel according to an example embodiment of the present disclosure may have a ninth pixel arrangement structure 152 which includes a first row in which B subpixels are arranged, and a second row in which G/R subpixels are alternately arranged in the first direction X1, wherein the B subpixels and the G/R subpixels are alternately arranged in the second direction Y1. The unit pixel PX may include B, G, and R subpixels arranged in a "ㅠ" structure.

When the output image displayed on the display panel having the ninth pixel arrangement structure 152 moves in the first direction X1, an image shift (in which the data for each subpixel moves by one pixel in the order of G, B, and R subpixels according to time) may be repeated up to a predetermined pixel movement amount.

When the output image displayed on the display panel having the ninth pixel arrangement structure 152 moves in the third direction X2, an image shift (in which the data for each subpixel moves by one pixel in the order of R, B, and G subpixels according to time) may be repeated up to a predetermined pixel movement amount.

When the output image displayed on the display panel having the ninth pixel arrangement structure 152 moves in the second direction Y1, an image shift (in which the data of B subpixel(s) move by one pixel according to time, and then the data of G/R subpixels move simultaneously by one pixel) may be repeated up to a predetermined pixel movement amount.

When the output image displayed on the display panel having the ninth pixel arrangement structure 152 moves in the fourth direction Y2, an image shift (in which the data of G/R subpixels move simultaneously by one pixel according to time, and then the data of B subpixel(s) move by one pixel) may be repeated up to a predetermined pixel movement amount.

Figure 15:
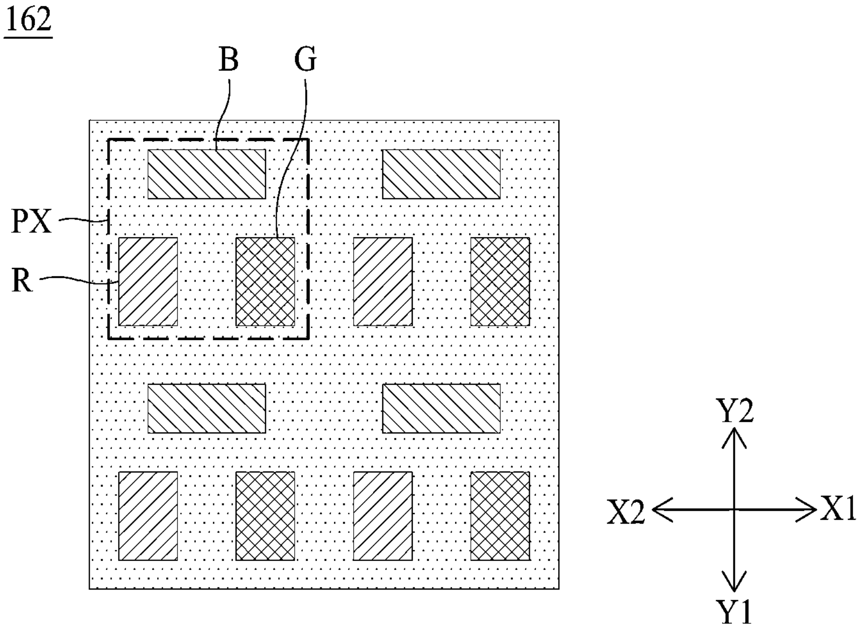

Referring to FIG. 15, the display panel according to an example embodiment of the present disclosure may have a tenth pixel arrangement structure 162 which includes a first row in which B subpixels are arranged, and a second row in which R/G subpixels are alternately arranged in the first direction X1, wherein the B subpixels and the R/G subpixels are alternately arranged in the second direction Y1. The unit pixel PX may include B, R, and G subpixels arranged in a "╥" structure.

When the output image displayed on the display panel having the tenth pixel arrangement structure 162 moves in the first direction X1, an image shift (in which the data for each subpixel moves by one pixel in the order of R, B, and G subpixels according to time) may be repeated up to a predetermined pixel movement amount.

When the output image displayed on the display panel having the tenth pixel arrangement structure 162 moves in the third direction X2, an image shift (in which the data for each subpixel moves by one pixel in the order of G, B, and R subpixels according to time) may be repeated up to a predetermined pixel movement amount.

When the output image displayed on the display panel having the tenth pixel arrangement structure 162 moves in the second direction Y1, an image shift (in which the data of B subpixel(s) move by one pixel according to time, and then the data of R/G subpixels move simultaneously by one pixel) may be repeated up to a predetermined pixel movement amount.

When the output image displayed on the display panel having the tenth pixel arrangement structure 162 moves in the fourth direction Y2, an image shift (in which the data of R/G subpixels move simultaneously by one pixel according to time, and then the data of B subpixel(s) move by one pixel) may be repeated up to a predetermined pixel movement amount.

Figure 16:
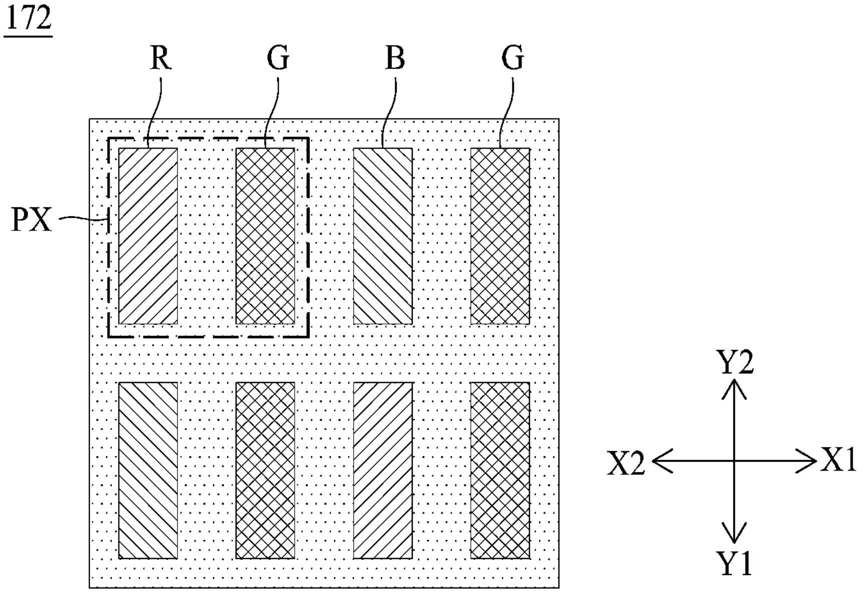

Referring to FIG. 16, the display panel according to an example embodiment of the present disclosure may include an eleventh pixel arrangement structure 172 in which a unit pixel PX including R and G subpixels and a unit pixel PX including B and G subpixels are alternately arranged in the first direction X1 and the second direction Y1. The eleventh pixel arrangement structure 172 may have an RGBG pentile stripe structure.

When the output image displayed on the display panel having the eleventh pixel arrangement structure 172 moves in the first direction X1, an image shift (in which the data of R/B subpixels move simultaneously by one pixel according to time, and then the data of G subpixel(s) move by one pixel) may be repeated up to a predetermined pixel movement amount.

When the output image displayed on the display panel having the eleventh pixel arrangement structure 172 moves in the third direction X2, an image shift (in which the data of G subpixel(s) move by one pixel according to time, and then the data of R/B subpixels move simultaneously by one pixel) may be repeated up to a predetermined pixel movement amount.

When the output image displayed on the display panel having the eleventh pixel arrangement structure 172 moves in each or one of the second direction Y1 and the fourth direction Y2, an image shift (in which the data of R, G, and B subpixels simultaneously move by one pixel along a respective direction according to time) may be repeated up to a predetermined pixel movement amount.

Figure 17:
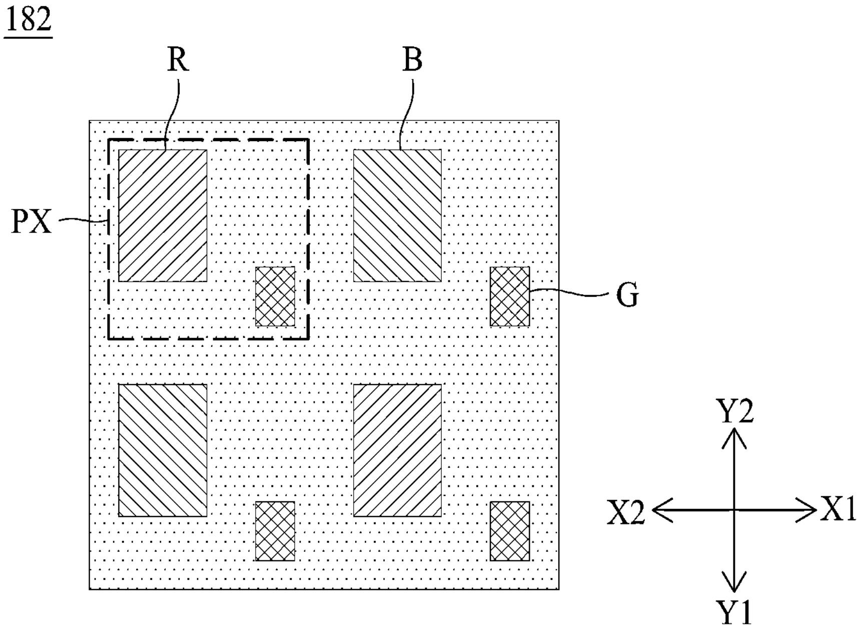

Referring to FIG. 17, the display panel according to an example embodiment of the present disclosure may include a twelfth pixel arrangement structure 182 in which a unit pixel PX including R and G subpixels and a unit pixel PX including B and G subpixels are alternately arranged in the first direction X1 and the second direction Y1. The twelfth pixel arrangement structure 182 may have an RGBG pentile diamond structure.

When the output image displayed on the display panel having the twelfth pixel arrangement structure 182 moves in each or one of the first direction X1 and the second direction Y1, an image shift (in which the data of R/B subpixels move simultaneously by one pixel along a respective direction according to time, and then the data of G subpixel(s) move by one pixel along a respective direction) may be repeated up to a predetermined pixel movement amount.

When the output image displayed on the display panel having the twelfth pixel arrangement structure 182 moves in each or one of the third direction X2 and the fourth direction Y2, an image shift (in which the data of G subpixel(s) move by one pixel along a respective direction according to time, and then the data of R/B subpixels move simultaneously by one pixel along a respective direction) may be repeated up to a predetermined pixel movement amount.

Figure 18:
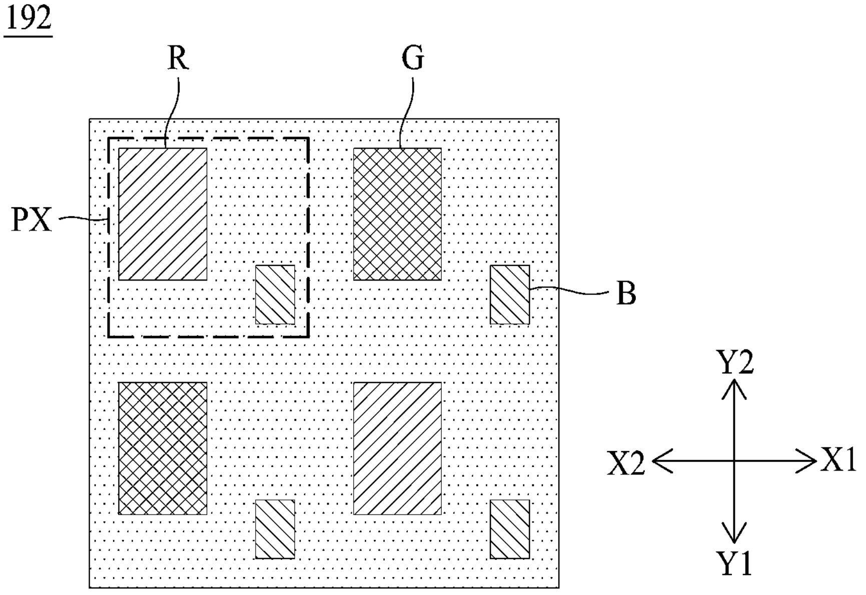

Referring to FIG. 18, the display panel according to an example embodiment of the present disclosure may include a thirteenth pixel arrangement structure 192 in which a unit pixel PX including R and B subpixels and a unit pixel PX including G and B subpixels are alternately arranged in the first direction X1 and the second direction Y1. The thirteenth pixel arrangement structure 192 may have an RBGB pentile diamond structure.

When the output image displayed on the display panel having the thirteenth pixel arrangement structure 192 moves in each or one of the first direction X1 and the second direction Y1, an image shift (in which the data of R/G subpixels move simultaneously by one pixel along a respective direction according to time, and then the data of B subpixel(s) move by one pixel along a respective direction) may be repeated up to a predetermined pixel movement amount.

When the output image displayed on the display panel having the thirteenth pixel arrangement structure 192 moves in each or one of the third direction X2 and the fourth direction Y2, an image shift (in which the data of B subpixel(s) move by one pixel along a respective direction according to time, and then the data of R/G subpixels move simultaneously by one pixel along a respective direction) may be repeated up to a predetermined pixel movement amount.

Figure 19:
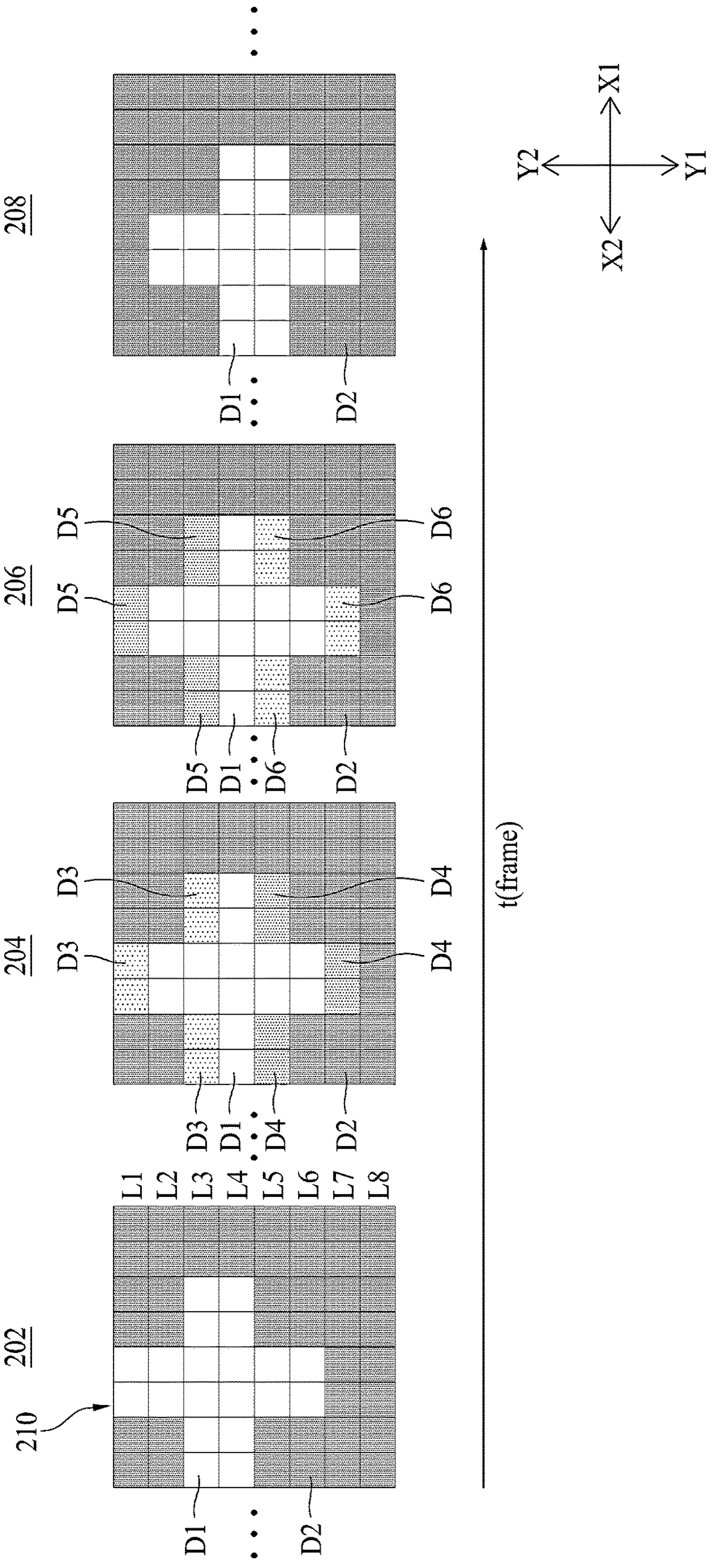
FIG. 19 illustrates a method for moving an image of the display device according to an example embodiment of the present disclosure.

FIG. 19 illustrates a method for moving an image of the display device according to an example embodiment of the present disclosure.

Referring to FIG. 19, the second to fifth image frames 202, 204, 206, and 208 may be displayed on the display panel 100 (see FIG. 1) by moving the data of the first image frame supplied according to the driving time "t" in the pixel unit from the timing controller 600.

Each of the second to fifth image frames 202, 204, 206, and 208 may display the associated luminance D1 to D6 corresponding to each respective unit pixel arranged in the display area AA of the display panel 100. The luminance D1 to D6 of each respective unit pixel may be displayed by the combination of the plurality of subpixels constituting each unit pixel.

The timing controller 600 may receive the same first image frame at a certain driving time "t", and may generate and output the second to fifth image frames 202, 204, 206, and 208 by dividing the data into the plurality of frames (e.g., 204, 206, and 208) when the data of the first image frame supplied according to the driving time "t" is moved in the second and fourth directions Y1 and Y2 in units of pixels.

For example, the timing controller 600 may output the same second image frame 202 as the received first image frame, so that the display panel (100, FIG. 1) may display the second image frame 202 at the first time. In the second image frame 202 which is the same as the first image frame, a test pattern 210 may display the first luminance D1 having high luminance and the other background portion may display the second luminance D2 having low luminance.

Then, the timing controller 600 may divide and move the data across the plurality of image frames 204, 206, and 208 when the received first image frame is moved by one pixel in the second direction Y1.

For example, as compared to the second to fifth image frames 202, 204, 205, and 206 sequentially displayed on the display panel, in the test pattern 210 of the second image frame 202, the first luminance D1 of the edge pixels located in the opposite direction Y2 of the movement direction Y1 may be divided into and moved to the gradually-decreased third and fifth luminance D3 and D5, and the first luminance D1 of the edge pixels located in the movement direction Y1 may be divided into and moved to the gradually-increased fourth and sixth luminance D4 and D6.

Accordingly, the image frames 202, 204, 205, and 206 displayed on the display panel 100 may move smoothly with the elapse of the driving time "t", thereby minimizing or preventing the movement of the image from being recognized.

Figure 20:
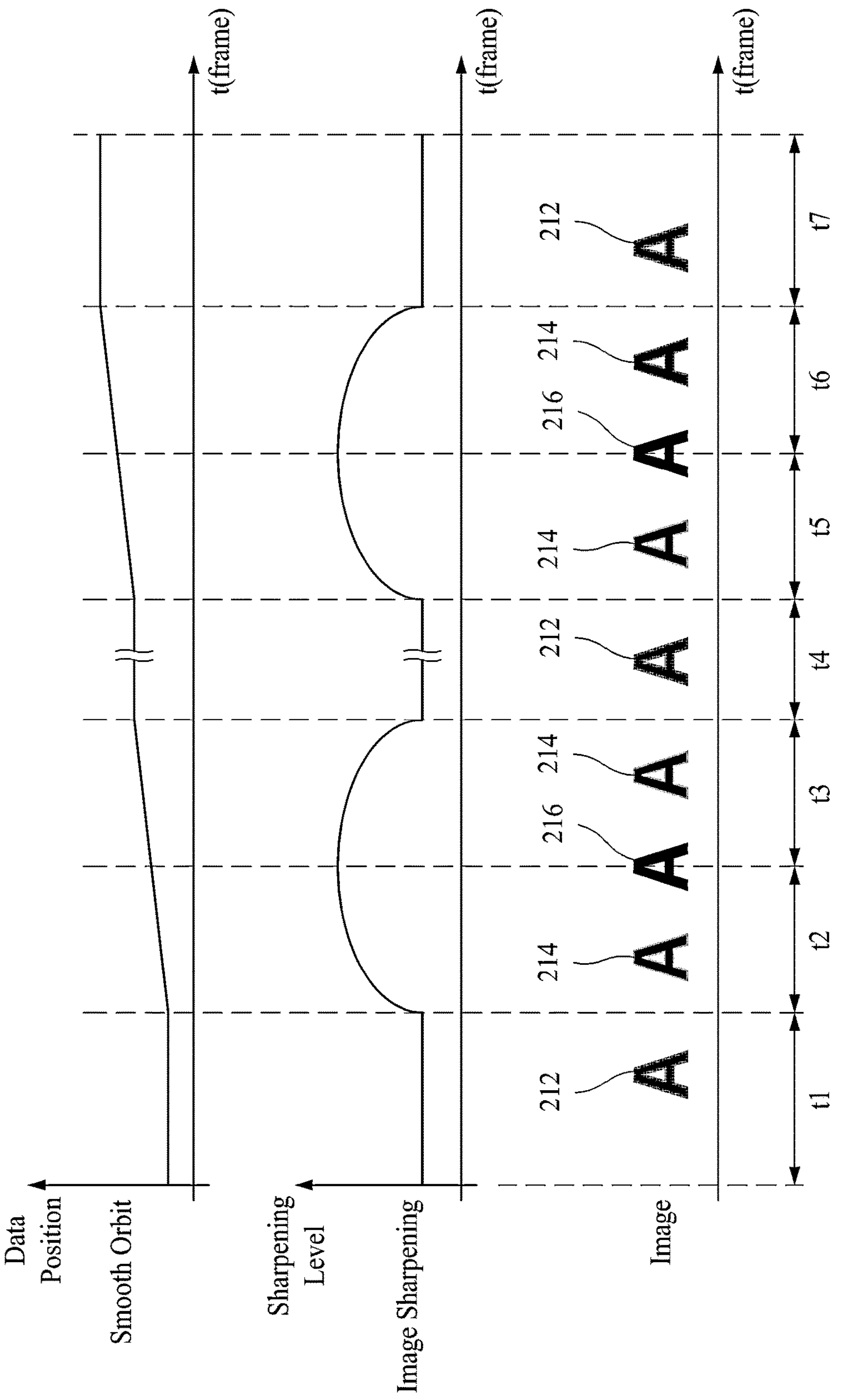
FIG. 20 illustrates a change in an image movement amount and a sharpening level according to time in the display device according to an example embodiment of the present disclosure.

FIG. 20 illustrates a change in an image movement amount and a sharpening level according to time in the display device according to an example embodiment of the present disclosure.

Referring to FIG. 20, a pixel movement amount, that is, a data position may be changed in the movement direction by the smooth image movement (smooth orbit) according to time "t" of the timing controller 600 according to an example embodiment of the present disclosure. The timing controller 600 according to an example embodiment of the present disclosure applies the sharpness image processing in the movement direction in association with the smooth image movement (smooth orbit), and varies the sharpening level of the output image, to thereby improve the sharpness.

For example, the timing controller 600 may improve the sharpness of the edge portion in the output images 214 and 216 by further performing the sharpness image processing for applying a sharpness coefficient in the movement direction during the times t2~t3 and t5~t6 in which the pixel movement amount is gradually increased in the movement direction by the smooth image movement (smooth orbit). During the times t2~t3 and t5~t6 in which the pixel movement amount is gradually increased, the sharpening level of the output images 214 and 216 may gradually increase and then decrease. During the times t1, t4, and t7 without the pixel movement, the sharpening image processing may be not applied to the output image 212.

FIGS. 21A to 23C are graphs illustrating a data smoothing variable for the smooth image movement in the display device according to an example embodiment of the present disclosure.

Figure 21A:
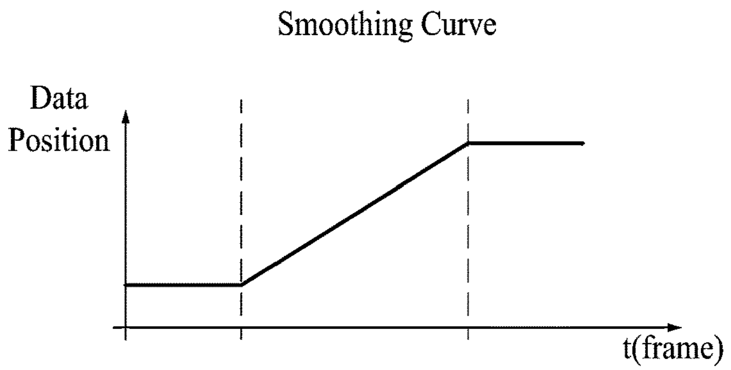
FIGS. 21A to 21C are graphs illustrating a change in an image movement amount according to time in the display device according to an example embodiment of the present disclosure.
Figure 21B:
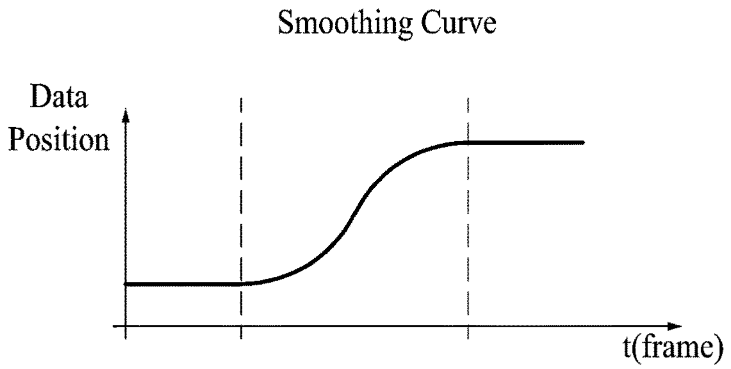
Figure 21C:
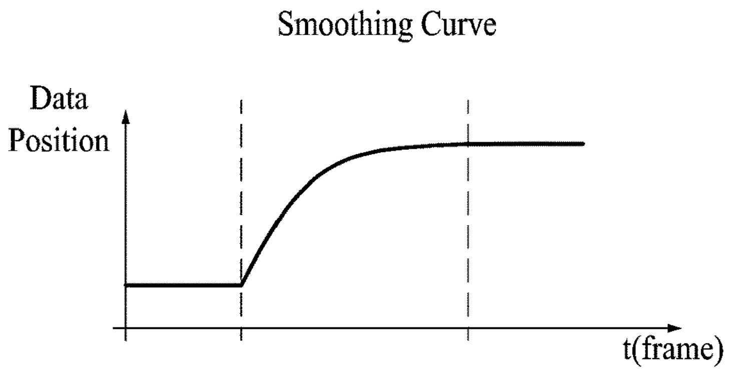

Referring to FIGS. 21A to 21C, in the display device according to an example embodiment of the present disclosure, the pixel movement amount (data position) may be changed in various smoothing curve shapes according to time, and an optimal smoothing curve may be applied according to the image.

Referring to FIG. 21A, the pixel movement amount (data position) according to time in the display device according to an example embodiment of the present disclosure may linearly increase from a minimum value to a maximum value.

Referring to FIG. 21B, in the display device according to an example embodiment of the present disclosure, the pixel movement amount (data position) according to time may increase in an S-shape from a minimum value to a maximum value.

Referring to FIG. 21C, in the display device according to an example embodiment of the present disclosure, the pixel movement amount (data position) according to time may increase in a curved shape from a minimum value to a maximum value.

Figure 22A:
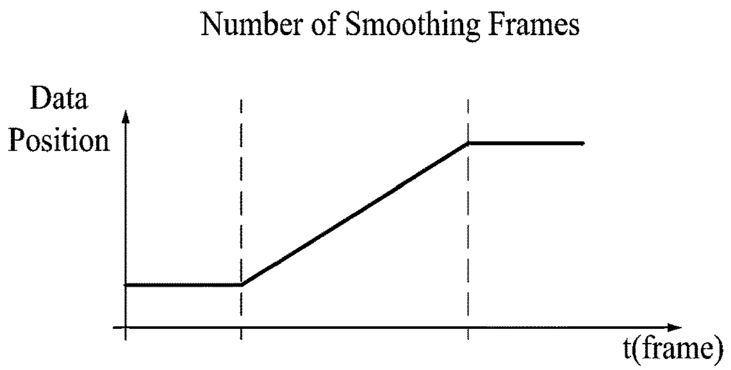
FIGS. 22A to 22C are graphs illustrating a change in the number of smoothing frames according to time in the display device according to an example embodiment of the present disclosure.
Figure 22B:
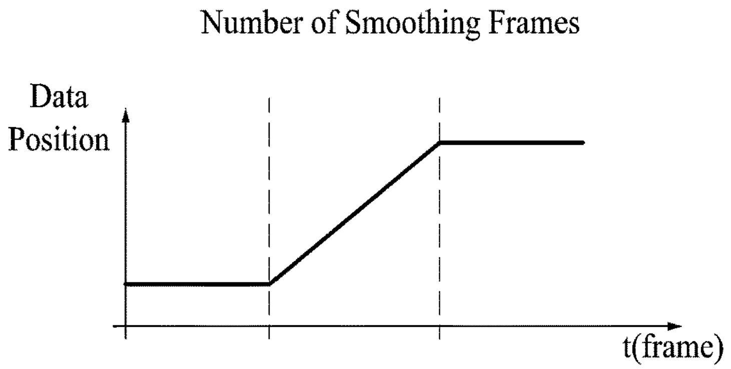
Figure 22C:
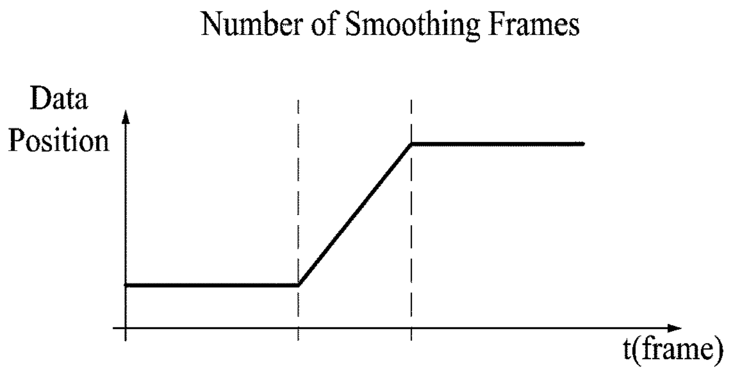

Referring to FIGS. 22A to 22C, the time during which the data position corresponding to the pixel movement amount increases according to time in the display device according to an example embodiment of the present disclosure, that is, the number of smoothing frames may be variously changed, and an optimal smoothing frame number may be applied according to the image.

Figure 23A:
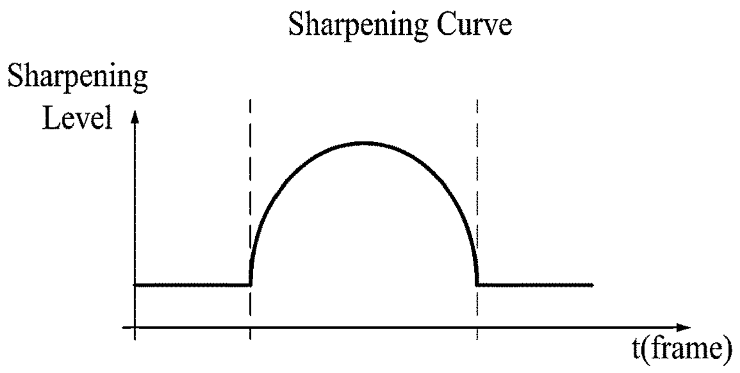
FIGS. 23A to 23C are graphs illustrating a change of a sharpness level according to time in the display device according to an example embodiment of the present disclosure.
Figure 23B:
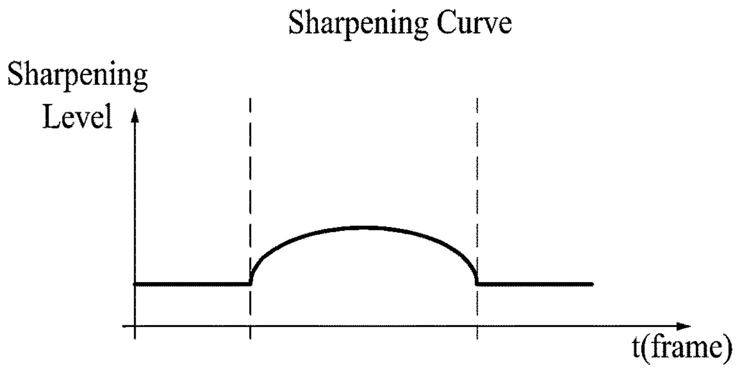
Figure 23C:
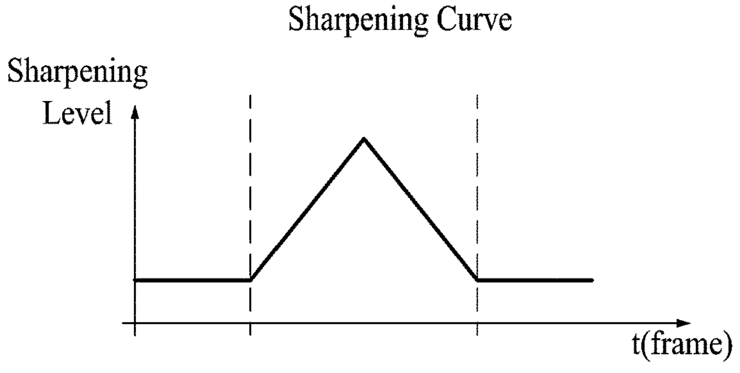

Referring to FIGS. 23A to 23C, in the display device according to an example embodiment of the present disclosure, the sharpening level applied in the image movement direction according to time may change in various sharpening curve shapes from a minimum value to a maximum value, and an optimal sharpening curve may be applied according to the image.

In one or more aspects, a movement of a subpixel may represent a movement of data for/of the subpixel. The term "for/or" may refer to "for or of". Further, a movement of an image frame may represent a movement of data for/of the image frame. In addition, moving an input image frame may represent moving data for/of an input image frame. Moving an input image frame for each subpixel may represent moving data of an input image frame for the subpixels. Moving data for each subpixel may represent moving data for the subpixels.

Furthermore, a movement order for/of each subpixel may represent a movement order for/of the subpixels, which may represent a movement order for/of data for/of the subpixels. For example, when a pixel arrangement structure 602 is provided with the R, G, and B subpixels as illustrated in FIG. 6, a movement order for each subpixel may represent a movement order for the subpixels in the pixel arrangement structure 602. In this example, when the movement direction is the first direction X1, the movement order for the subpixels is that (i) data of R subpixels in the pixel arrangement structure 602 move, then (ii) data of G subpixels in the pixel arrangement structure 602 move, and then (iii) data of B subpixels in the pixel arrangement structure 602 move. Still in this example, when the movement direction is the third direction X2, the movement order for the subpixels is that (i) data of B subpixels in the pixel arrangement structure 602 move, then (ii) data of G subpixels in the pixel arrangement structure 602 move, and then (iii) data of R subpixels in the pixel arrangement structure 602 move. Still in this example, when the movement direction is the second direction Y1 or the fourth direction Y2, the movement order for the subpixels is that data of the R, G, and B subpixels in the pixel arrangement structure 602 move simultaneously.

Moreover, a movement direction may represent a direction of moving data of subpixels or may represent a direction of moving data of an image frame (e.g., a first direction X1, a second direction Y1, a third direction X3, or a fourth direction Y2). Furthermore, pixel arrangement structures (see, e.g., FIGS. 6 to 18) illustrate various arrangements of subpixels.

In addition, preferentially moving a subpixel(s) may represent moving data of the subpixel(s) before moving data of a different subpixel(s). For example, when a pixel arrangement structure 602 is provided with the R, G, and B subpixels as illustrated in FIG. 6, and when a movement direction is the first direction X1, it should be noted that the R subpixels are located in a direction opposite to the first direction X1. Therefore, data of the R subpixels may be preferentially moved. In other words, in this example, data of the R subpixels are moved before moving data of G and B subpixels.

Furthermore, in one or more examples, a phrase that data of an input image frame is divided into output image frames and that the divided output image frames are moved, may represent the following: that data of an input image frame is divided into data of output image frames (e.g., 502, 504, 506 and 508 of FIG. 5) and that the data of the output image frames (e.g., 502, 504, 506 and 508 of FIG. 5) are moved.

In one or more aspects, a controller (e.g., 600 of FIG. 1) may perform various operations, such as determining a movement order for subpixels based on a movement direction and an arrangement of subpixels, moving subpixels (or moving data of subpixels), dividing data of an input image frame into data of output image frames, moving data of the output image frames, and changing a sharpening level of an output image frame.

As described above, the display device and the driving method thereof according to one or more example embodiments of the present disclosure move the image data for each subpixel according to time, thereby improving the afterimage life by the stress dispersion of each pixel and minimizing or preventing the image movement from being recognized owing to the smooth image movement.

According to one or more example embodiments of the present disclosure, the display device and the driving method thereof divide the image data into the several frames and move the image data for each subpixel according to time, thereby improving the afterimage life and minimizing or preventing the image movement from being recognized owing to the smooth image movement.

According to one or more example embodiments of the present disclosure, the display device and the driving method thereof change the sharpening level of the image according to the image movement direction in association with the smooth image movement, thereby improving image quality by minimizing blur artifacts due to smooth image movement as well as improving image quality by changing the sharpening level of the image according to the image movement direction.

The display device according to one or more example embodiments of the present disclosure may improve the image quality by improving the afterimage lifespan, thereby reducing power consumption.

According to one or more example embodiments of the present disclosure, a display device may include a display panel having subpixels, a controller configured to generate an output image frame based on (or by) moving a received input image frame for the subpixels according to time and to output the generated output image frame, and a panel driver configured to display the generated output image frame on the display panel. A movement order for the subpixels may be determined based on a movement direction and an arrangement of the subpixels disposed on the display panel. The subpixels may be utilized in outputting the generated output image frame to the display panel.

According to one or more example embodiments of the present disclosure, the controller may determine the movement order for the subpixels according to (or based on) the movement direction and relative positions of the subpixels arranged in a unit pixel of the display panel.

According to one or more example embodiments of the present disclosure, the controller may preferentially move the subpixel located in a direction opposite to the movement direction in the unit pixel.

According to one or more example embodiments of the present disclosure, the controller may divide data of the input image frame into data of a plurality of output image frames, and may move the data of plurality of output image frames.

According to one or more example embodiments of the present disclosure, the controller may change a sharpening level of the output image frame in association with the movement direction.

According to one or more example embodiments of the present disclosure, the display panel may have a pixel arrangement structure in which red, green, and blue subpixels are alternately arranged in a first direction, and the subpixels of the same color are arranged in a second direction. If an output image displayed on the display panel moves in the first direction, an image shift, in which data of the red, green, and blue subpixels sequentially move, may be repeated. If an output image displayed on the display panel moves in a third direction opposite to the first direction, an image shift, in which data of the blue, green, and red subpixels sequentially move, may be repeated. If an output image displayed on the display panel moves in at least one of the second direction and a fourth direction opposite to the second direction, an image shift, in which data of the red, green, and blue subpixels simultaneously move, may be repeated.

According to one or more example embodiments of the present disclosure, the display panel may have a pixel arrangement structure in which red, white, blue, and green subpixels are alternately arranged in a first direction, and the subpixels of the same color are arranged in a second direction. If an output image displayed on the display panel moves in the first direction, an image shift, in which data of the red, white, blue, and green subpixels sequentially move, may be repeated. If an output image displayed on the display panel moves in a third direction opposite to the first direction, an image shift, in which data of the green, blue, white, and red subpixels sequentially move, may be repeated. If an output image displayed on the display panel moves in at least one of the second direction and a fourth direction opposite to the second direction, an image shift, in which data of the red, white, blue, and green subpixels simultaneously move, may be repeated.

According to one or more example embodiments of the present disclosure, the display panel may have a pixel arrangement structure in which first and second subpixels are arranged in a second direction, and third subpixels are arranged in a first direction to be parallel to the first and second subpixels. If an output image displayed on the display panel moves in the first direction, an image shift, in which data of the first and second subpixels simultaneously move and then data of the third subpixels move, may be repeated. If an output image displayed on the display panel moves in a third direction opposite to the first direction, an image shift, in which data of the third subpixels move and then data of the first and second subpixels move simultaneously may be repeated. If an output image displayed on the display panel moves in the second direction, an image shift, in which data of the first, third, and second subpixels sequentially move, may be repeated. If an output image displayed on the display panel moves in a fourth direction opposite to the second direction, an image shift, in which data of the second, third, and first subpixels sequentially move, may be repeated.

According to one or more example embodiments of the present disclosure, the display panel may have a pixel arrangement structure in which first and second subpixels are arranged in parallel in a first direction, and third subpixels are arranged in a second direction to be parallel to the first and second subpixels. If an output image displayed on the display panel moves in the first direction, an image shift, in which data of the first, third, and second subpixels sequentially move, may be repeated. If an output image displayed on the display panel moves in a third direction opposite to the first direction, an image shift, in which data of the second, third, and first subpixels move sequentially, may be repeated. If an output image displayed on the display panel moves in the second direction, an image shift, in which data of the first and second subpixels simultaneously move and the data of the third subpixels move, may be repeated. If an output image displayed on the display panel moves in a fourth direction opposite to the second direction, an image shift, in which data of the third subpixels move and then data of the first and second subpixels simultaneously move, may be repeated.

According to one or more example embodiments of the present disclosure, the display panel may have a pixel arrangement structure in which third subpixels are arranged in a first direction, and first and second subpixels are arranged in parallel to the first direction while being close to the third subpixels in a second direction. If an output image displayed on the display panel moves in the first direction, an image shift, in which data of the second, third, and first subpixels sequentially move, may be repeated. If an output image displayed on the display panel moves in a third direction opposite to the first direction, an image shift, in which data of the first, third, and second subpixels move sequentially, may be repeated. If an output image displayed on the display panel moves in the second direction, an image shift, in which data of the third subpixels move and then data of the first and second subpixels simultaneously move, may be repeated. If an output image displayed on the display panel moves in a fourth direction opposite to the second direction, an image shift, in which data of the first and second subpixels simultaneously move and then data of the third subpixels move, may be repeated.

According to one or more example embodiments of the present disclosure, the display panel may have a pixel arrangement structure including a first pixel and a second pixel. The first pixel may include a first subpixel and a second subpixel arranged in a first direction. The second pixel may include a third subpixel and an another-second subpixel arranged in the first direction. The first pixel and the second pixel may be alternately arranged in the first direction and may be alternately arranged in a second direction. If an output image displayed on the display panel moves in the first direction, an image shift, in which data of the first and third subpixels move and then data of the second and another-second subpixels move simultaneously, may be repeated. If an output image displayed on the display panel moves in a third direction opposite to the first direction, an image shift, in which data of the second and another-second subpixels move simultaneously and then data of the first and third subpixels move, may be repeated. If an output image displayed on the display panel moves in at least one of the second direction and a fourth direction opposite to the second direction, an image shift, in which data of the first, second, third, and another-second subpixels move simultaneously, may be repeated.

The display device according to one or more aspects of the present disclosure may be included or used in various electronic devices. For example, the display device according to one or more aspects of the present disclosure may be included or used in a mobile device, a video phone, a smart watch, a watch phone, a wearable device, a foldable device, a rollable device, a bendable device, a flexible device, a curved device, a navigation system, a vehicle navigation system, a vehicle display device, a television, a wall paper display device, a signage device, and a home appliance.

Advantages and features of the present disclosure, and implementation methods thereof are clarified through the embodiments and described with reference to the accompanying drawings. The present disclosure may, however, be embodied in different forms and should not be construed as being limited to the embodiments set forth herein. Rather, these embodiments are provided so that this disclosure is thorough and complete, and fully conveys the scope of the present disclosure to those skilled in the art. Further, the present disclosure is only defined by the scope of the claims.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A display device, comprising:

a display panel including subpixels;

a controller configured to generate an output image frame based on moving a received input image frame for the subpixels according to time and to output the generated output image frame; and a panel driver configured to display the generated output image frame on the display panel, wherein a movement order for the subpixels is determined based on a movement direction and an arrangement of the subpixels disposed on the display panel, and wherein the subpixels are for being utilized in outputting the generated output image frame to the display panel, and wherein the controller is configured to preferentially move data of the subpixel located in a direction opposite to the movement direction in a unit pixel.

2. The display device according to claim 1, wherein the movement order for the subpixels is determined according to the movement direction and relative positions of the subpixels arranged in the unit pixel of the display panel.

3. The display device according to claim 1, wherein the controller is configured to divide data of the received input image frame into data of a plurality of output image frames, and move the data of the plurality of output image frames.

4. The display device according to claim 1, wherein the controller is configured to change a sharpening level of the output image frame in association with the movement direction.

5. The display device according to claim 1, wherein:

the display panel has a pixel arrangement structure in which red, green, and blue subpixels are alternately arranged in a first direction, and the subpixels of a same color are arranged in a second direction;

when an output image displayed on the display panel moves in the first direction, an image shift, in which data of the red, green, and blue subpixels sequentially move, is repeated;

when an output image displayed on the display panel moves in a third direction opposite to the first direction, an image shift, in which data of the blue, green, and red subpixels sequentially move, is repeated; and when an output image displayed on the display panel moves in at least one of the second direction and a fourth direction opposite to the second direction, an image shift, in which data of the red, green, and blue subpixels simultaneously move, is repeated.

6. The display device according to claim 1, wherein:

the display panel has a pixel arrangement structure in which red, white, blue, and green subpixels are alternately arranged in a first direction, and the subpixels of a same color are arranged in a second direction;

when an output image displayed on the display panel moves in the first direction, an image shift, in which data of the red, white, blue, and green subpixels sequentially move, is repeated;

when an output image displayed on the display panel moves in a third direction opposite to the first direction, an image shift, in which data of the green, blue, white, and red subpixels sequentially move, is repeated; and when an output image displayed on the display panel moves in at least one of the second direction and a fourth direction opposite to the second direction, an image shift, in which data of the red, white, blue, and green subpixels simultaneously move, is repeated.

7. The display device according to claim 1, wherein:

the display panel has a pixel arrangement structure in which first and second subpixels are arranged in a second direction, and third subpixels are arranged in a first direction parallel to the first and second subpixels;

when an output image displayed on the display panel moves in the first direction, an image shift, in which data of the first and second subpixels simultaneously move and then data of the third subpixels move, is repeated;

when an output image displayed on the display panel moves in a third direction opposite to the first direction, an image shift, in which data of the third subpixels move and then data of the first and second subpixels move simultaneously, is repeated;

when an output image displayed on the display panel moves in the second direction, an image shift, in which data of the first, third, and second subpixels sequentially move, is repeated; and when an output image displayed on the display panel moves in a fourth direction opposite to the second direction, an image shift, in which data of the second, third, and first subpixels sequentially move, is repeated.

8. The display device according to claim 1, wherein:

the display panel has a pixel arrangement structure in which first and second subpixels are arranged in parallel in a first direction, and third subpixels are arranged in a second direction parallel to the first and second subpixels;

when an output image displayed on the display panel moves in the first direction, an image shift, in which data of the first, third, and second subpixels sequentially move, is repeated;

when an output image displayed on the display panel moves in a third direction opposite to the first direction, an image shift, in which data of the second, third, and first subpixels move sequentially, is repeated;

when an output image displayed on the display panel moves in the second direction, an image shift, in which data of the first and second subpixels simultaneously move and then data of the third subpixels move, is repeated; and when an output image displayed on the display panel moves in a fourth direction opposite to the second direction, an image shift, in which data of the third subpixels move and then data of the first and second subpixels simultaneously move, is repeated.

9. The display device according to claim 1, wherein:

the display panel has a pixel arrangement structure in which third subpixels are arranged in a first direction, and first and second subpixels are arranged in parallel to the first direction while being close to the third subpixels in a second direction;

when an output image displayed on the display panel moves in the first direction, an image shift, in which data of the second, third, and first subpixels sequentially move, is repeated;

when an output image displayed on the display panel moves in a third direction opposite to the first direction, an image shift, in which data of the first, third, and second subpixels move sequentially, is repeated;

when an output image displayed on the display panel moves in the second direction, an image shift, in which data of the third subpixels move and then data of the first and second subpixels simultaneously move, is repeated; and when an output image displayed on the display panel moves in a fourth direction opposite to the second direction, an image shift, in which data of the first and second subpixels simultaneously move and then data of the third subpixels move, is repeated.

10. The display device according to claim 1, wherein:

the display panel has a pixel arrangement structure including a first pixel and a second pixel, wherein the first pixel includes a first subpixel and a second subpixel arranged in a first direction, wherein the second pixel includes a third subpixel and an another-second subpixel arranged in the first direction, and wherein the first pixel and the second pixel are alternately arranged in the first direction and are alternately arranged in a second direction;

when an output image displayed on the display panel moves in the first direction, an image shift, in which data of the first and third subpixels move and then data of the second and another-second subpixels move simultaneously, is repeated;

when an output image displayed on the display panel moves in a third direction opposite to the first direction, an image shift, in which data of the second and another-second subpixels move simultaneously and then data of the first and third subpixels move, is repeated; and when an output image displayed on the display panel moves in at least one of the second direction and a fourth direction opposite to the second direction, an image shift, in which data of the first, second, third, and another-second subpixels move simultaneously, is repeated.

* * * * *